United States Patent
Pursifull

(10) Patent No.: US 9,435,300 B2
(45) Date of Patent: Sep. 6, 2016

(54) METHOD AND SYSTEM FOR VACUUM GENERATION

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 424 days.

(21) Appl. No.: 13/950,196

(22) Filed: Jul. 24, 2013

(65) Prior Publication Data

US 2014/0165931 A1 Jun. 19, 2014

Related U.S. Application Data

(63) Continuation-in-part of application No. 13/802,020, filed on Mar. 13, 2013.

(60) Provisional application No. 61/737,004, filed on Dec. 13, 2012.

(51) Int. Cl.
*F02N 1/00* (2006.01)
*F02M 35/10* (2006.01)
(Continued)

(52) U.S. Cl.
CPC ......... *F02M 35/10229* (2013.01); *F02B 37/16* (2013.01); *F02B 37/18* (2013.01); *F02D 41/0002* (2013.01); *F02D 41/0007* (2013.01); *F02D 2250/41* (2013.01); *F02M 25/0713* (2013.01); *F02M 25/0722* (2013.01); *F16K 1/126* (2013.01); *F16K 15/00* (2013.01);
(Continued)

(58) Field of Classification Search
CPC ................ F02M 35/10229; F02M 25/0707; F02M 25/0713; F02M 25/0722; Y10T 137/0391; F02D 2250/41; F02D 41/0002; F02D 41/0007; F16K 31/12; F16K 1/126; F16K 15/00; F16K 17/00; F02B 37/18; F02B 37/16; Y02T 10/144
USPC ............ 123/184.53, 184.56, 339.23; 60/397, 60/398, 602, 605.1, 605.2, 611
See application file for complete search history.

(56) References Cited

U.S. PATENT DOCUMENTS

| 4,281,686 A * | 8/1981 | Gerlitz | B60H 1/00314 137/625.46 |
| 5,005,550 A * | 4/1991 | Bugin, Jr. | F02M 25/089 123/520 |

(Continued)

OTHER PUBLICATIONS

Beshay, Mansour, et al., "Aspirator for Crankcase Ventilation and Vacuum Generation," U.S. Appl. No. 13/549,226, filed Jul. 13, 2012, 43 pages.

(Continued)

*Primary Examiner* — Joseph Dallo
(74) *Attorney, Agent, or Firm* — Julia Voutyras; Alleman Hall McCoy Russell & Tuttle LLP

(57) ABSTRACT

Methods and systems are provided for controlling motive flow through an ejector using a pneumatically controlled valve. A valve coupled upstream of an intake ejector may be adjusted based on boost pressure to control motive flow into the ejector from upstream of a compressor. This allows motive flow through the ejector to be controlled based on vacuum needs at low component cost without loss of boost pressure.

17 Claims, 13 Drawing Sheets

(51) Int. Cl.
  *F16K 31/12*     (2006.01)
  *F02B 37/18*     (2006.01)
  *F02M 25/07*     (2006.01)
  *F16K 1/12*      (2006.01)
  *F02B 37/16*     (2006.01)
  *F16K 17/00*     (2006.01)
  *F16K 15/00*     (2006.01)
  *F02D 41/00*     (2006.01)

(52) U.S. Cl.
  CPC .............. *F16K 17/00* (2013.01); *F16K 31/12* (2013.01); *Y02T 10/144* (2013.01); *Y10T 137/0391* (2015.04)

(56) References Cited

U.S. PATENT DOCUMENTS

| | | | | |
|---|---|---|---|---|
| 6,138,648 A * | 10/2000 | Zentgraf | F02B 29/0431 | 123/563 |
| 6,394,760 B1 * | 5/2002 | Tell | F04F 5/467 | 417/174 |
| 6,668,553 B1 * | 12/2003 | Ghizawi | F02B 33/44 | 415/111 |
| 6,670,067 B2 * | 12/2003 | Sato | F04F 5/466 | 429/443 |
| 6,951,199 B2 * | 10/2005 | Suzuki | B60T 13/46 | 123/339.11 |
| 7,004,154 B2 * | 2/2006 | Joyce | F02B 29/0418 | 123/559.1 |
| 7,174,883 B2 * | 2/2007 | Sonoda | F02D 9/1015 | 123/586 |
| 7,854,118 B2 * | 12/2010 | Vetrovec | F02B 33/40 | 123/559.1 |
| 8,925,520 B2 * | 1/2015 | Pursifull | F02M 35/10229 | 123/339.23 |
| 2003/0106538 A1 * | 6/2003 | Benson | F02B 43/00 | 123/527 |
| 2007/0295303 A1 * | 12/2007 | Hirooka | B60T 17/02 | 123/339.23 |
| 2008/0264059 A1 * | 10/2008 | Hirooka | B60T 13/52 | 60/547.1 |
| 2008/0267789 A1 * | 10/2008 | Hirooka | B60T 17/02 | 417/187 |
| 2008/0273992 A1 * | 11/2008 | Killion | F04B 23/12 | 417/185 |
| 2009/0043477 A1 * | 2/2009 | Oi | F02D 9/02 | 701/103 |
| 2009/0317676 A1 * | 12/2009 | Andreas-Schott | F16K 11/0525 | 429/423 |
| 2011/0132311 A1 * | 6/2011 | Pursifull | F02M 35/10229 | 123/184.56 |
| 2012/0237365 A1 * | 9/2012 | Ulrey | F04F 5/54 | 417/54 |
| 2012/0237367 A1 * | 9/2012 | Cunningham | F02M 35/10 | 417/55 |
| 2012/0237368 A1 * | 9/2012 | Pursifull | F02B 37/164 | 417/55 |
| 2013/0167812 A1 * | 7/2013 | Kurihara | F02M 25/0709 | 123/568.11 |
| 2013/0233276 A1 | 9/2013 | Pursifull et al. | | |
| 2014/0137553 A1 * | 5/2014 | Ulrey | F02B 37/16 | 60/602 |
| 2015/0308329 A1 * | 10/2015 | Ulrey | F02B 37/16 | 60/605.1 |

OTHER PUBLICATIONS

Ulrey, Joseph Norman, et al., "Method and System for Fuel Vapor Management," U.S. Appl. No. 13/660,884, filed Oct. 25, 2012, 37 pages.

Ulrey, Joseph Norman, et al., "Method and System for Vacuum Generation," U.S. Appl. No. 13/670,644, filed Nov. 7, 2012, 35 pages.

Anonymous, "Concept, Method, & Apparatus to Test Brake Systems Under Simulated High Altitude (Low Atmospheric Pressure) Conditions While Operating the Test Vehicle at or Near Sea Level Conditions," IPCOM No. 000204962, Published Mar. 14, 2011, 3 pages.

* cited by examiner

METHOD AND SYSTEM FOR VACUUM GENERATION

CROSS REFERENCE TO RELATED APPLICATION

The present application is a continuation-in-part of U.S. patent application Ser. No. 13/802,020, filed on Mar. 13, 2013, which claims the benefit of and priority to U.S. Provisional Patent Application No. 61/737,004, filed on Dec. 13, 2012, the entire contents of each of which are hereby incorporated by reference for all purposes.

FIELD

The present invention relates to improving the vacuum generation efficiency of an ejector coupled to an engine system.

BACKGROUND/SUMMARY

Vehicle systems may include various vacuum consumption devices that are actuated using vacuum. These may include, for example, a brake booster. Vacuum used by these devices may be provided by a dedicated vacuum pump. In still other embodiments, one or more ejectors may be coupled in the engine system that may harness engine airflow and use it to generate vacuum.

As such, an amount of vacuum generated at an ejector can be controlled by controlling the motive air flow rate through the ejector. In one example, this may be achieved through the use of a large, electric solenoid valve positioned upstream of the ejector. By controlling the opening of the solenoid valve, the amount of rate and air flowing through the ejector can be varied, thereby adjusting vacuum generation as engine operating conditions change. However, the inventors herein have recognized that such solenoid valves can add significant component and operating costs to the engine system. As a result, the cost of including the valve may reduce the advantages of ejector vacuum control. As such, if the air flow through the ejector is not controlled, the full vacuum generation potential of the ejector may not be taken advantage of. Further, loss of boost pressure may result from reverse flow through the ejector, as may occur during conditions of high boost pressure.

Thus in one example, the above issue may be at least partially addressed by a method of operating an engine that enables lower cost ejector vacuum control. The method includes adjusting a valve coupled upstream of an intake ejector based on boost pressure, the valve adjusted to control motive flow into the ejector from upstream of a compressor.

Further, in some examples, the method may include opening the valve responsive to vacuum level at a vacuum reservoir to vary a motive flow through an ejector coupled across an intake throttle, the valve coupled upstream (or downstream) of the ejector. The vacuum may be drawn at the ejector and the drawn vacuum may be stored in the vacuum reservoir. In this way, motive flow can be increased in response to a need for vacuum replenishment without sacrificing boost pressure.

For example, an engine system may include an ejector coupled across an intake throttle in a bypass passage. A vacuum-actuated valve may be coupled upstream of the ejector to vary a motive flow through the ejector. The vacuum-actuated valve may be directly coupled to the vacuum reservoir with no solenoid in between, and the valve may be coupled to an outlet of a compressor. In such an embodiment, the opening or closing of the vacuum-actuated valve may be directly adjusted based on the vacuum level of the reservoir and further based on boost pressure. When the vacuum level in the reservoir is lower (e.g., below a threshold) and boost pressure is lower (e.g., below a threshold pressure), the valve may be actuated open so as to increase motive flow through the ejector. This increased motive flow results in a corresponding increase in vacuum generation at the ejector, which can then be used to replenish the vacuum reservoir. In contrast, when the vacuum level in the reservoir is higher (e.g., above the threshold) and/or the boost pressure is higher (e.g., above the threshold pressure), the valve may be actuated closed so as to decrease motive flow through the ejector and prevent flow of air from the intake manifold to the inlet of the compressor. This decreased motive flow results in a corresponding decrease in vacuum generation at the ejector. By only allowing motive flow when the vacuum reservoir needs it's vacuum replenished, that motive flow has the least opportunity to cause air flow disturbances where engine air flow rate is in excess of desired engine air flow rate. Further, by only allowing motive flow when boost pressure is low, loss of boost may be reduced.

It will be appreciated that in alternate embodiments, the ejector may be located such that the high pressure side of the ejector is downstream of the air filter, the crankcase, and at the compressor outlet. Likewise, alternate taps for the low pressure side of the ejector may be downstream of the air filter and the crankcase.

In this way, motive flow through an ejector can be adjusted based on vacuum requirements and further based on boost pressure. By opening a vacuum-actuated valve, coupled in series with the ejector, in response to a drop in vacuum levels at a vacuum reservoir, motive flow at the ejector can be increased to replenish the reservoir. Then, once the vacuum is sufficiently full, the valve may be closed. Overall, the vacuum generation efficiency of the ejector and ejector motive flow control is improved without substantially increasing component cost or complexity. Additionally, boost pressure may be maintained by closing the valve when boost pressure exceeds a threshold.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 4:
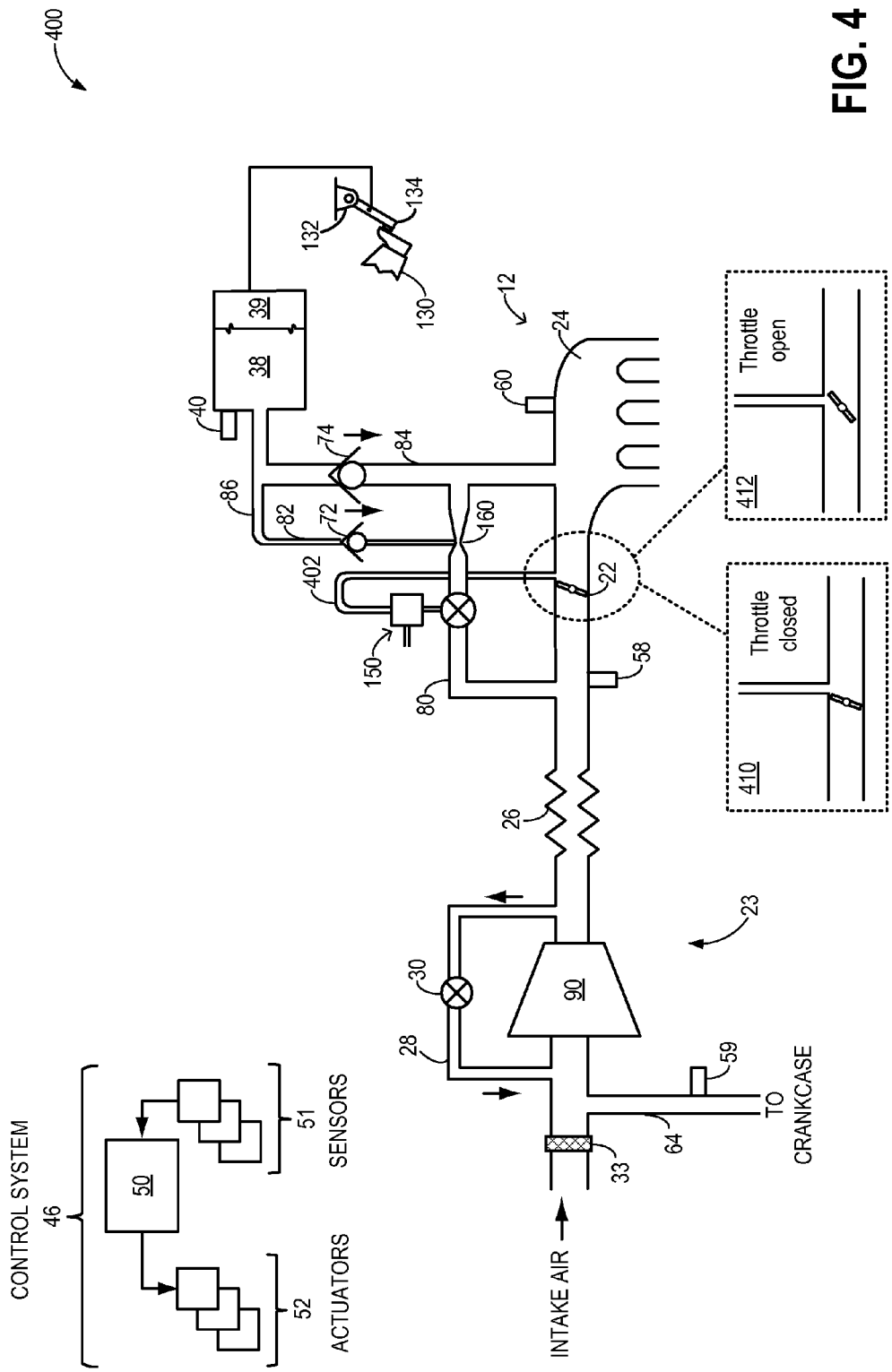
Figure 5:
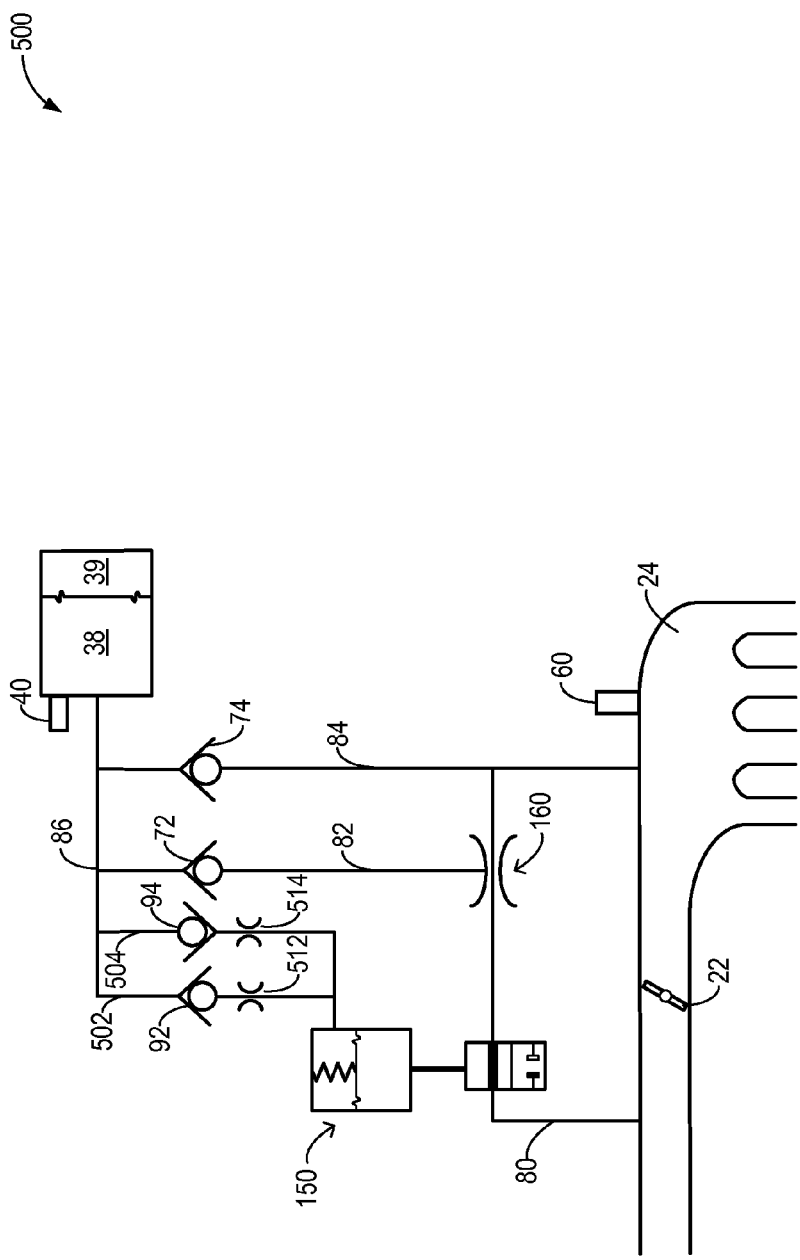
Figure 6:
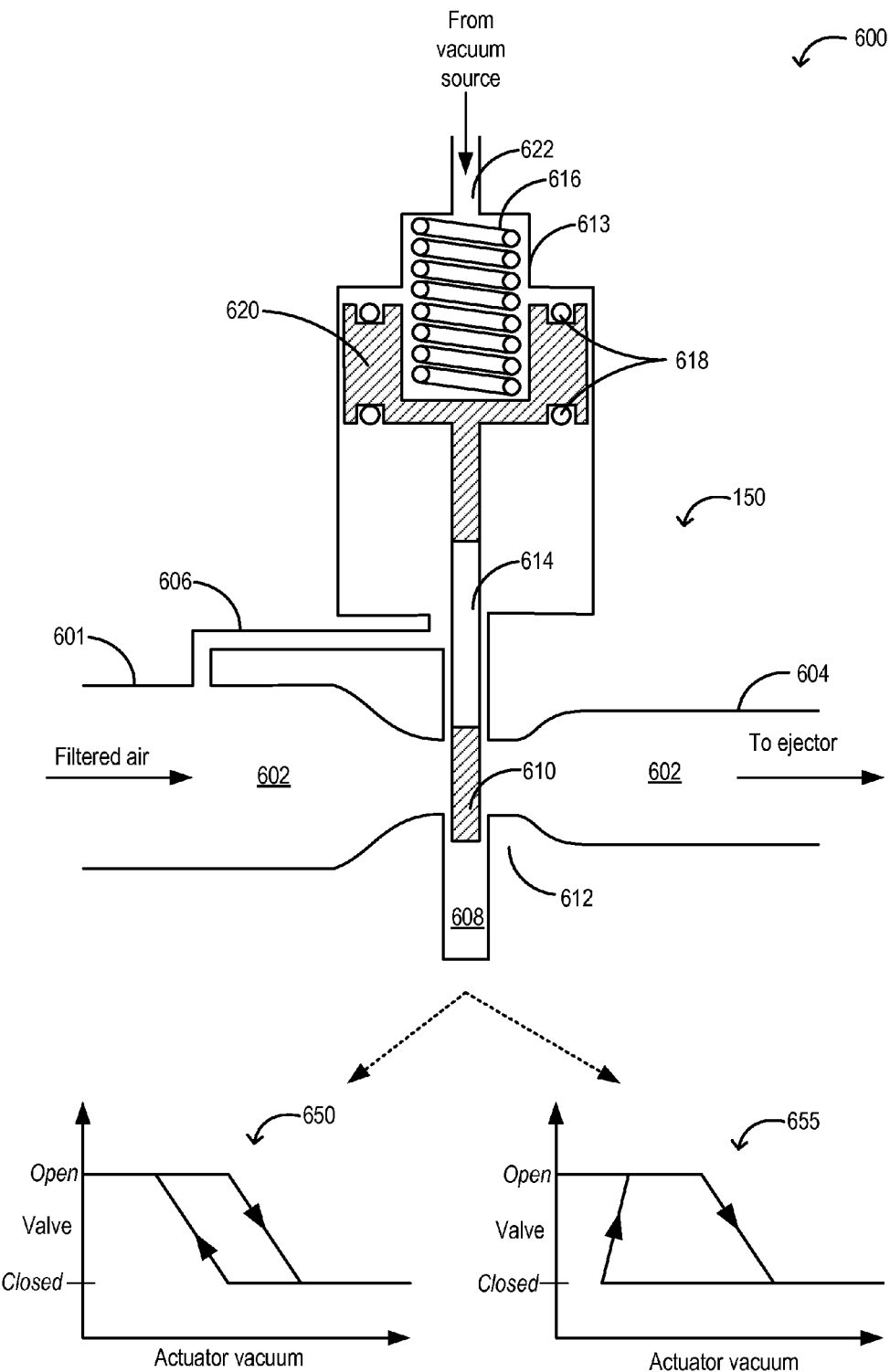
FIG. 6 shows a detailed view of a vacuum-actuated valve for controlling motive flow through the ejector.
Figure 7:
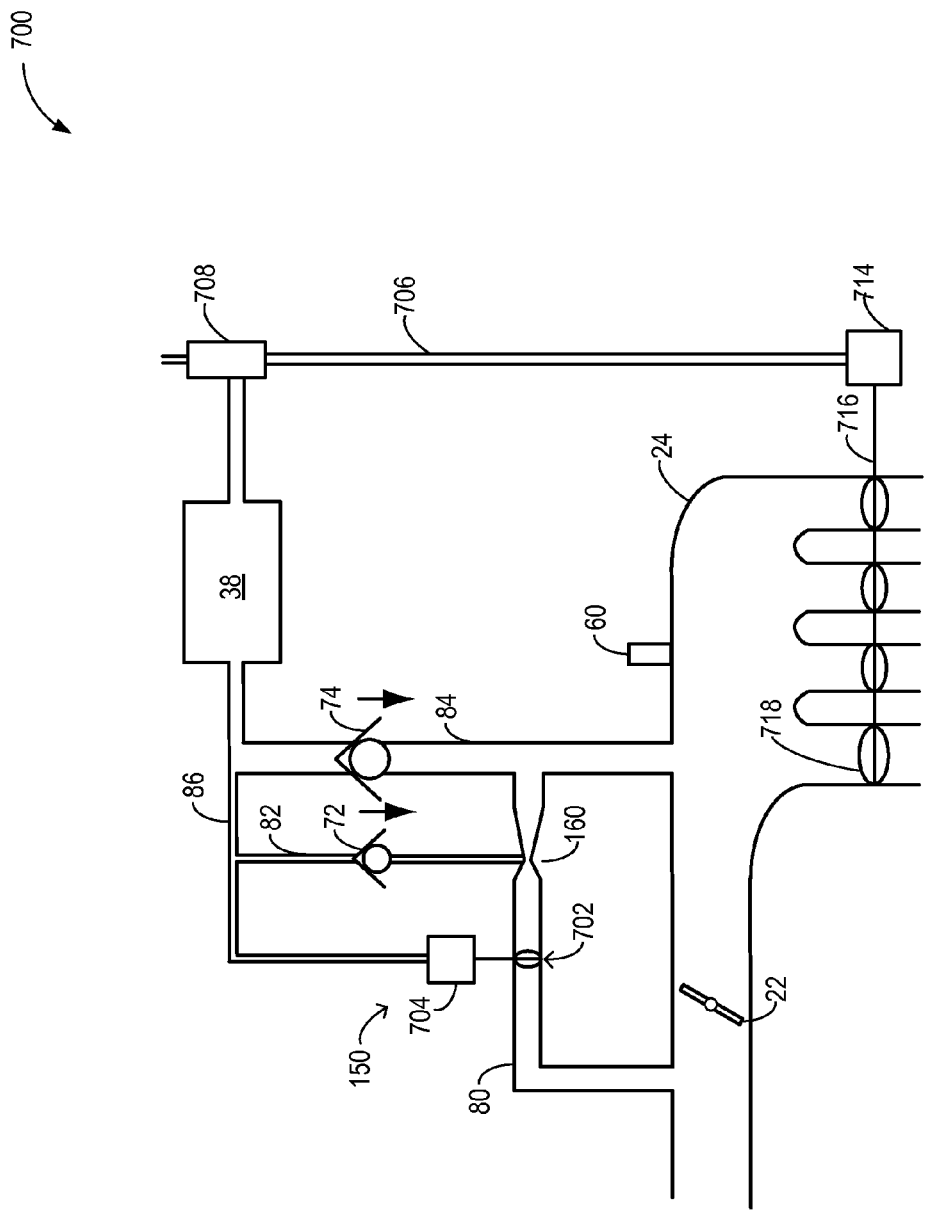
FIG. 7 shows an embodiment of the engine system wherein motive flow through the ejector is controlled using a vacuum-actuated throttle.

Methods and systems are provided for controlling an motive flow through an ejector coupled to an engine system, such as the engine systems of FIGS. 1-5, 7, and 10, at low cost. A motive flow valve may be coupled to the ejector, as shown at FIGS. 1-5 and 10. The valve may be pneumatically controlled and vacuum actuated so that motive flow through the valved ejector can be appropriately increased or decreased (FIG. 6). In some embodiments, as shown at FIG. 7, a vacuum-actuated throttle may be used to control motive flow through the ejector. By coupling the vacuum-actuated valve (or throttle) to a vacuum reservoir of the engine system, the valve may be actuated open or closed based on vacuum replenishment needs. A controller may be configured to perform a control routine, such as the example routines of FIGS. 8 and 11, to open the valve to increase motive flow (and vacuum generation) at the ejector when vacuum availability at the reservoir is low, while closing the valve to decrease motive flow (and vacuum generation) at the ejector when the vacuum in the reservoir is replenished. Example valve adjustments are described at FIGS. 9 and 12. In this way, a low cost solution for ejector motive flow control is provided.

Figure 1:
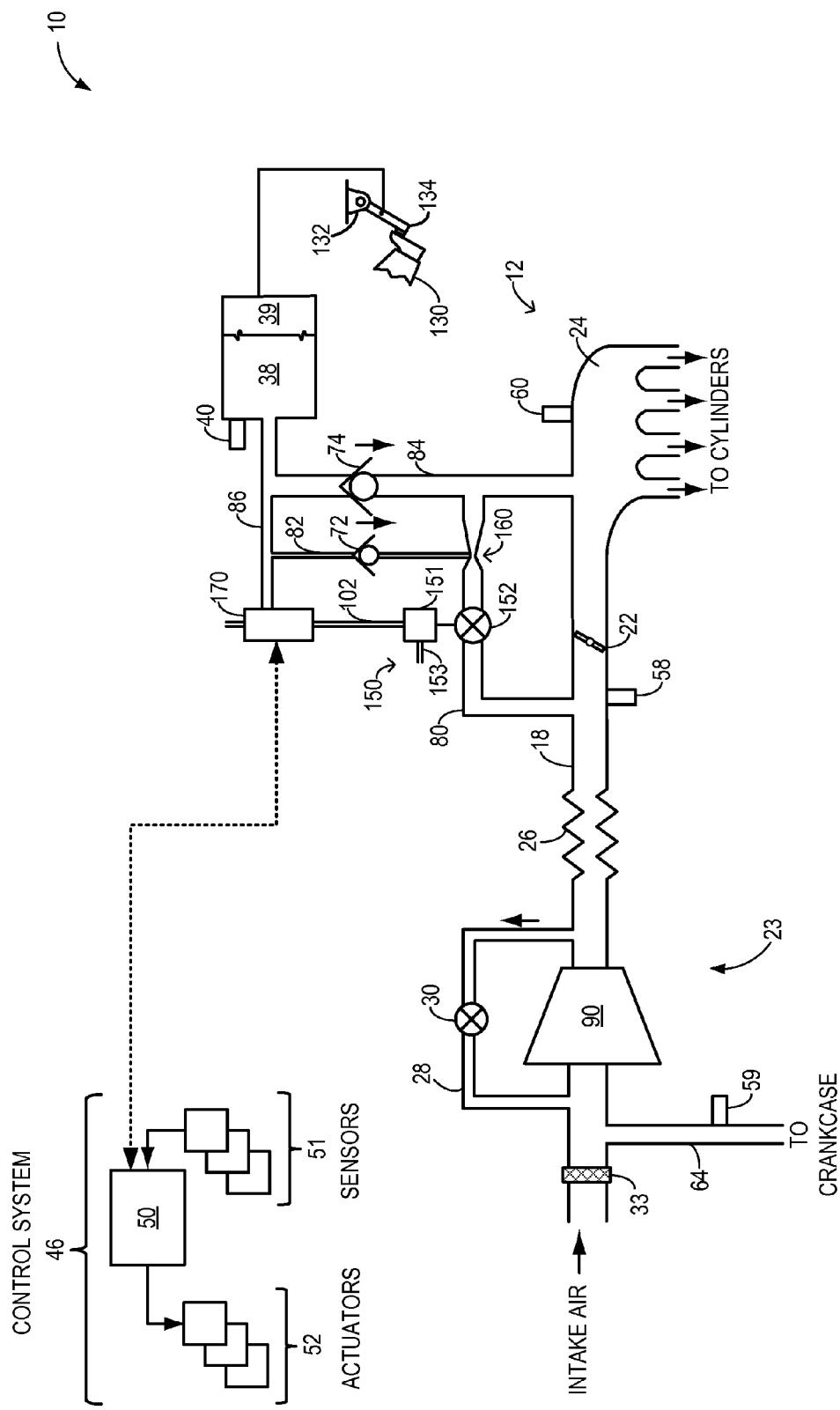
FIG. 1 shows a schematic depiction of an engine system including a valved ejector.

FIG. 1 shows a first example embodiment of an engine system including a valved ejector. FIGS. 2-5 and 10 show alternate embodiments of the engine system. A further embodiment is shown in FIG. 7. As such, components introduced in FIG. 1 are similarly numbered in subsequent figures and not reintroduced.

Turning to FIG. 1, it shows an example engine system 10 including an engine 12. In the present example, engine 12 is a spark-ignition engine of a vehicle, the engine including a plurality of cylinders (not shown). Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 has an engine intake 23 that includes an air intake throttle 22 fluidly coupled to an engine intake manifold 24 along an intake passage 18. Air may enter intake passage 18 from an air intake system (AIS) including an air cleaner 33 in communication with the vehicle's environment. A position of throttle 22 may be varied by a controller 50 via a signal provided to an electric motor or actuator included with the throttle 22, a configuration that is commonly referred to as electronic throttle control (ETC). In this manner, the throttle 22 may be operated to vary the intake air provided to the intake manifold and the plurality of engine cylinders. The intake 23 may include throttle inlet pressure sensor 58 and a manifold air pressure sensor 60 for providing respective signals MAF and MAP to controller 50.

In some embodiments, engine system 10 is a boosted engine system, where the engine system further includes a boosting device. In the present example, intake passage 18 includes a compressor 90 for boosting an intake aircharge received along intake passage 18. A charge air cooler 26 (or intercooler) is coupled downstream of compressor 90 for cooling the boosted aircharge before delivery to the intake manifold. In embodiments where the boosting device is a turbocharger, compressor 90 may be coupled to, and driven by an exhaust turbine (not shown). Further compressor 90 may be, at least in part, driven by an electric motor or the engine crankshaft.

An optional bypass passage 28 may be coupled across compressor 90 so as to divert at least a portion of intake air compressed by compressor 90 back upstream of the compressor. An amount of air diverted through bypass passage 28 may be controlled by opening compressor bypass valve (CBV) 30 located in bypass passage 28. By controlling CBV 30, and varying an amount of air diverted through the bypass passage 28, a boost pressure provided downstream of the compressor can be regulated. This enables boost control and surge control.

In some embodiments, engine system 10 may include a positive crankcase ventilation (PCV) system (not shown) that is coupled to the engine intake so that gases in the crankcase may be vented in a controlled manner from the crankcase. Therein, during non-boosted conditions (when manifold pressure (MAP) is less than barometric pressure (BP)), air is drawn into the crankcase via a breather or vent tube 64. Crankcase ventilation tube 64 may be coupled to fresh air intake passage 18 upstream of compressor 90. In some examples, the crankcase ventilation tube 64 may be coupled downstream of air cleaner 33 (as shown). In other examples, the crankcase ventilation tube may be coupled to intake passage 13 upstream of air cleaner 33. A pressure sensor 59 may be coupled in the crankcase vent tube 64 to provide an estimate of the crankcase vent tube pressure and the compressor inlet pressure.

A conduit 80, parallel to air intake passage 18, may be configured to divert a portion of the intake air received from downstream of the air cleaner 33 and the compressor 90 to intake manifold 24 via an ejector 160. Conduit 80 may be coupled to air intake passage 18 at a point downstream of charge air cooler 26. Ejector 160 may be an ejector, aspirator, eductor, venturi, jet pump, or similar passive device. In the present example, the ejector is a three port device including a motive inlet, a mixed flow outlet, and a throat/entraining inlet. Ejector 160 has an upstream motive flow inlet via which air enters the ejector. Ejector 160 further includes a neck or entraining inlet communicating with a vacuum reservoir 38 along a first passage 82. Air flowing through the motive inlet may be converted to flow energy in the ejector 160, thereby creating a low pressure communicated to the neck (or entraining inlet) and drawing a vacuum at the neck. Vacuum drawn at the neck of ejector 160 is directed to vacuum reservoir through first check valve 72 located in the first passage 82. The first check valve 72 allows vacuum reservoir 38 to retain any of its vacuum should the pressures in the ejector's motive inlet and the vacuum reservoir equalize. While the depicted embodiment shows first check valve 72 as a distinct valve, in alternate embodiments of the ejector, check valve 72 or 74 may be integrated into the ejector.

Ejector 160 further includes a downstream mixed flow outlet via which air that has passed through ejector 160 can exit and be directed to intake manifold 24. As such, intake manifold 24 is also coupled to vacuum reservoir 38 along second passage 84. Conduit 80 may be alternatively or additionally connected one or more other high pressure nodes higher in pressure that the low pressure node connected to passage 84. Check valve 74 in second passage 84 allows vacuum generated at the intake manifold to be directed to vacuum reservoir 38 but does not allow air flow from the intake manifold to the vacuum reservoir. Also, during conditions when air pressure in the intake manifold is higher, check valve 74 does not allow air to flow back through the ejector and into conduit 80, from where the air may be directed back to the intake passage, upstream of compressor 90. Since the vacuum reservoir 38 can receive vacuum directly from intake manifold 24, second check valve 74 allows vacuum reservoir 38 to retain any of its vacuum should the pressure in the intake manifold 24 and the vacuum reservoir equalize. In some embodiments, check valve 74 may be referred to as the bypass path, providing a high flow rate path for air from the vacuum reservoir to the intake manifold. This flow path dominates while reservoir pressure is above manifold pressure. As such, the high pressure point in the depicted system (compressor outlet) may always connect to the ejector inlet and the ejector outlet point may be routed to the low pressure point (intake manifold). In an alternate embodiment, the ejector outlet may be routed to the lowest pressure point via check valves. On a boosted engine, the low pressure point may sometimes be the intake manifold and at other times may be the compressor inlet. In still further embodiments, actively controlled valves may be used in place of the passive check valves if it is cost effective.

Vacuum reservoir 38 may be coupled to one or more engine vacuum consumption devices 39. For example, vacuum consumption device 39 may be a brake booster coupled to vehicle wheel brakes wherein vacuum reservoir 38 is a vacuum cavity in front of a diaphragm of the brake booster. Therein, vacuum reservoir 38 may be an internal vacuum reservoir configured to amplify a force provided by a vehicle operator 130 via a brake pedal 134 for applying vehicle wheel brakes (not shown). A position of the brake pedal 134 may be monitored by a brake pedal sensor 132. In alternate embodiments, the vacuum reservoir may be a low pressure storage tank included in a fuel vapor purge system, a vacuum reservoir coupled to a turbine wastegate, a vacuum reservoir coupled to a charge motion control valve, etc. In some embodiments, as depicted, a vacuum sensor 40 (or pressure sensor) may be coupled to the vacuum reservoir 38 for providing an estimate about the vacuum level at the reservoir.

A vacuum-actuated valve 150 (herein also referred to as ejector motive flow control valve 150) may be coupled upstream of ejector 160 in conduit 80. As elaborated herein with reference to FIG. 6, an opening of vacuum-actuated valve 150 may be adjusted based on an engine vacuum requirement to thereby vary a motive flow (amount and/or rate) through the ejector. For example, the opening may be adjusted based on a vacuum level of vacuum reservoir 38 such that valve 150 is opened (or an opening is increased) responsive to a low vacuum condition (e.g., responsive to a vacuum level at the vacuum reservoir being lower than a threshold). Further, valve 150 may be closed (or an opening may be decreased) responsive to a high vacuum condition (e.g., responsive to the vacuum level at the vacuum reservoir being higher than the threshold). By varying the motive flow through the ejector 160, an amount of vacuum drawn at the ejector neck can be modulated to meet engine vacuum requirements.

Vacuum-actuated valve 150 consists of a vacuum-actuator 151 and a valve 152. Vacuum-actuated valve 150 further includes a vent 153. That vent may be connected to the motive flow conduit either upstream or downstream of the valve. Alternatively, the vent may connect to atmosphere. The vacuum actuator may be a linear or rotational actuator. The valve may be a pivoting plate, a gate valve, a poppet valve, etc.

Vacuum-actuated valve 150 may be coupled to vacuum reservoir 38 directly or indirectly. For example, as depicted in the embodiment of FIG. 1, valve 150 is coupled to vacuum reservoir 38 via vacuum solenoid 170. Vacuum solenoid 170 may be controlled by controller 50 based on the vacuum level in vacuum reservoir 38. By controlling the vacuum solenoid to control the vacuum-actuated valve, controller 50 may have near full control over the vacuum-actuated valve, thereby controlling the ejector's motive flow. When vacuum requirements are high due to actuation of various engine vacuum consumers and while vacuum levels in vacuum reservoir 38 are lower than a threshold, vacuum solenoid 170 may be positioned to apply atmospheric air (or a high gas pressure of any type) to 150 to insure that the ejector motive flow control valve is open. As a result, vacuum-actuated valve 150 may be vented (via vent 153) and exposed to atmospheric pressure. This opens vacuum-actuated valve 150 and increases ejector motive flow, thereby generating more vacuum at the ejector which may be used by the various vacuum consumers. In comparison, when there is sufficient vacuum at the vacuum reservoir (e.g., while vacuum levels in vacuum reservoir 38 are higher than the threshold), vacuum solenoid 170 may be positioned such that the available vacuum is applied to the ejector valve's pneumatic actuator 151 and it closes. As a result, vacuum-actuated valve 150 may be exposed to the high vacuum conditions of the reservoir. This closes vacuum-actuated valve 150 and decreases ejector motive flow. In this way, the vacuum-actuated valve may be controlled to provide a high motive flow rate ejector without degrading the intake throttle's ability to establish idle air flow rates during hot idle conditions.

As such, the engine has a very low air flow rate requirement when the engine is up to operating temperature, the Front End Accessory Drive (FEAD) loads are low, and the torque converter loads are low. By opening the ejector valve on an on-demand basis, conditions where the ejector motive flow can cause air flow greater than desired are reduced (e.g., minimized). Since air flow rate greater than desired leads to extra fuel being injected, by reducing the likelihood of air flow disturbances, engine performance and fuel economy is improved.

As shown at FIG. 1, a neck of the ejector 160 is coupled to the vacuum reservoir 38 along first passage 82, while an outlet of the ejector 160 is coupled to the vacuum reservoir 38 along second passage 84 and while the vacuum-actuated valve 150 is coupled to the vacuum reservoir 38 along third passage 102 via vacuum vent solenoid 170. Each of the first, second, and third passages may then merge at fourth passage 86, downstream (in the direction of flow) of an outlet of the vacuum reservoir. Each of the first and second passages includes respective check valves to control flow direction to/from the reservoir. The second passage 84 further couples the vacuum reservoir 38 to the engine intake manifold 24 downstream (in the direction of flow) of a juncture with the ejector outlet.

Figure 2:
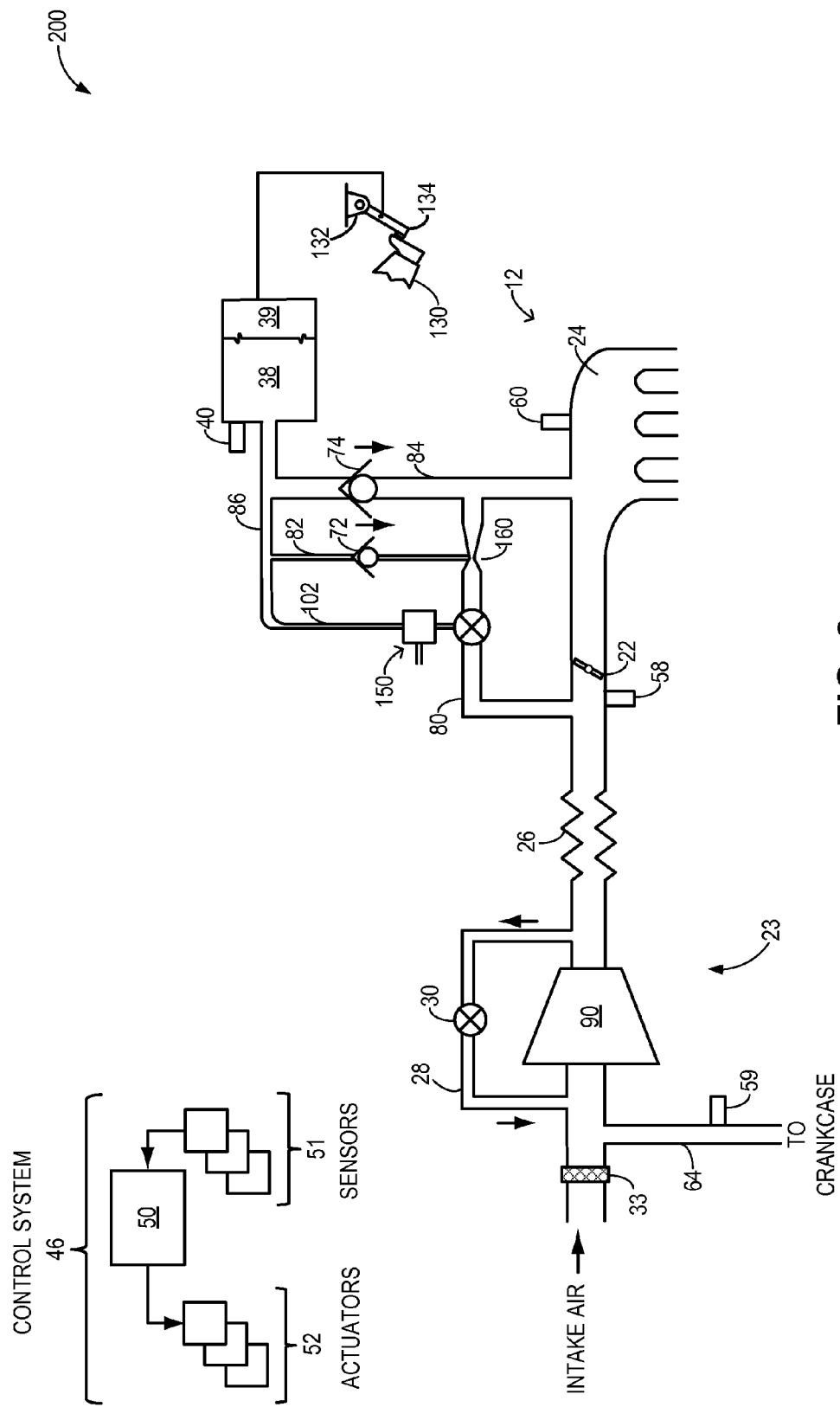
FIGS. 2-5 show alternate embodiments of an engine system including a valved ejector.

A second, alternate embodiment 200 is shown at FIG. 2. In the depicted embodiment, vacuum-actuated valve 150 is directly coupled to vacuum reservoir 38 with no intermediate solenoid valve. As depicted, a neck of the ejector 160 is coupled to the vacuum reservoir 38 along first passage 82, while an outlet of the ejector 160 is coupled to the vacuum reservoir 38 along second passage 84 and while the vacuum-actuated valve 150 is directly coupled to the vacuum reservoir 38 along third passage 102 without an intervening vacuum vent solenoid 170. Each of the first, second, and third passages may then merge at fourth passage 86, downstream (in the direction of flow) of an outlet of the vacuum reservoir. Each of the first and second passages includes respective check valves to control flow direction to/from the reservoir. The second passage 84 further couples the vacuum reservoir 38 to the engine intake manifold 24 downstream (in the direction of flow) of a juncture with the ejector outlet.

The depicted implementation results in the vacuum-actuated valve opening when vacuum levels in the vacuum reservoir are low and the valve closing when vacuum levels in the vacuum reservoir are high. As an example, the vacuum-actuated valve may open in response to low brake booster vacuum and close in response to high brake booster vacuum. It will be appreciated that while the depicted embodiments are described using a brake booster as the vacuum consumer, in alternate embodiments, an alternate engine vacuum consumer may be substituted. For example, the vacuum reservoir may be coupled to one or more of a brake booster, a purge canister, a charge motion control valve, crankcase ventilation, and a turbine wastegate. Further still, any vacuum reservoir may be substituted. In this way, by coupling the valve directly to the vacuum reservoir, and adjusting the opening of the vacuum-actuated valve based on the vacuum level of the vacuum reservoir, the ejector valve may be actuated open any time the vacuum reservoir needs replenishment.

Figure 3:
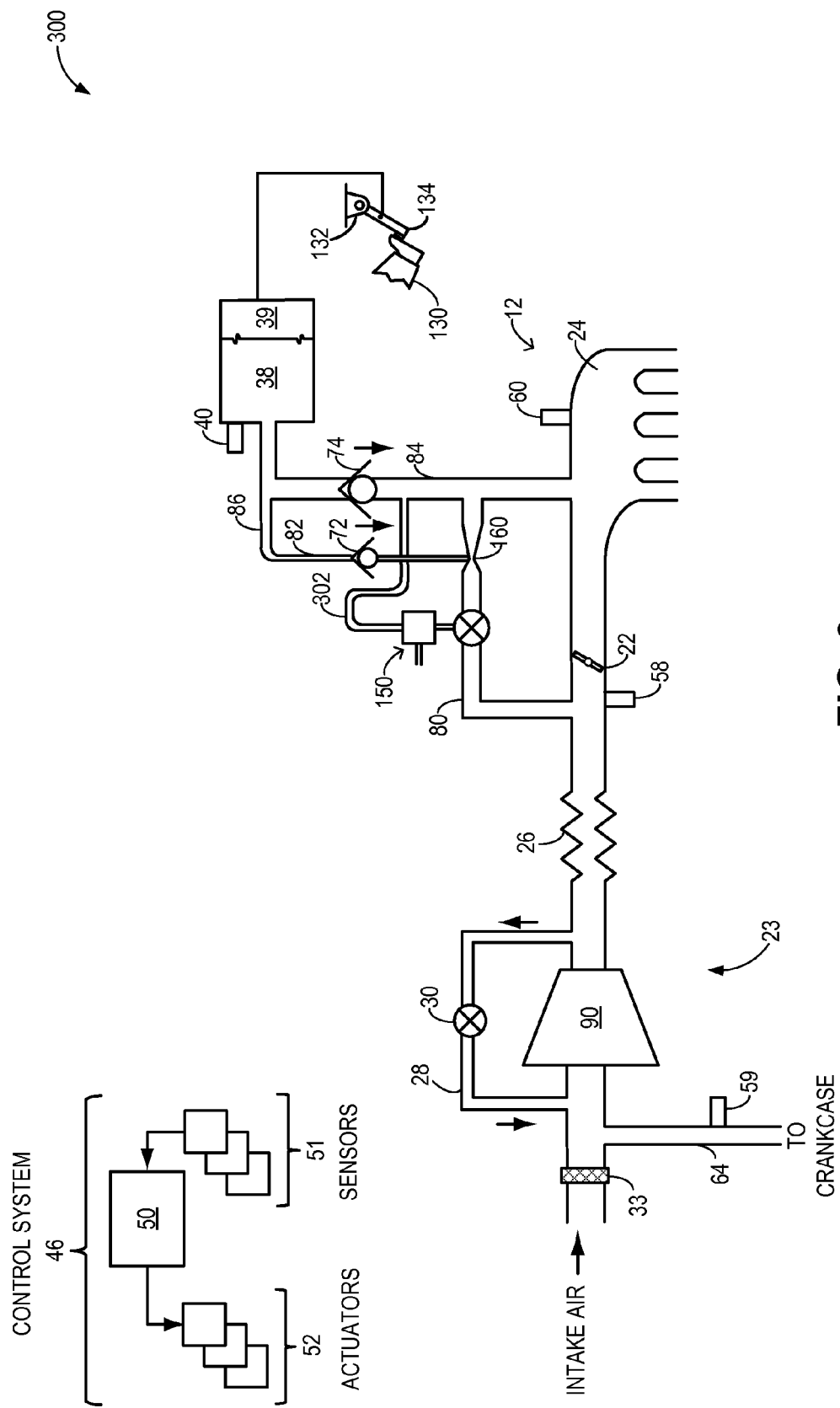

A third, further embodiment 300 is shown at FIG. 3. In the depicted embodiment, vacuum-actuated valve 150 is directly coupled to intake manifold 24 with no intermediate solenoid valve. In the depicted configuration, the neck of the ejector is coupled to the vacuum reservoir along the first passage 82, an outlet of the ejector is coupled to the vacuum reservoir along the second passage 84, the second passage further coupling the vacuum reservoir to an engine intake manifold downstream of a juncture with the ejector outlet, each of the first and second passages including a check valve. However, the vacuum-actuated valve is coupled along third passage 302 to the vacuum reservoir and the intake manifold via the second passage 84. Specifically, third passage 302 may be coupled to second passage 84 upstream of the juncture of second passage 84 with the ejector outlet.

The depicted implementation results in the vacuum-actuated valve opening when intake manifold vacuum is low and the valve closing when intake manifold vacuum is high. This configuration provides synergistic benefits with throttle control and air flow control. Specifically, when the intake throttle 22 is near a closed position and is at risk of running out of authority (that is, hitting the closed stop position), the intake manifold vacuum is high and motive flow is not required. During these very conditions, the vacuum-actuated valve is closed and motive flow is not provided, thereby overcoming airflow errors and related disturbances. In this way, by coupling the valve directly to the vacuum reservoir, and adjusting the opening of the vacuum-actuated valve based on the vacuum level of the intake manifold, the ejector valve may be actuated open any time the intake manifold vacuum needs to be supplemented with additional vacuum.

In the depicted configuration, the vacuum reservoir 38 is primarily supplied vacuum from the intake manifold via check valve 74. However when this vacuum source wanes, the ejector motive flow control valve 150 opens to supply vacuum via check valve 72. In this way, the occasion for throttle bypass flow is minimized.

In an embodiment, the ejector motive flow control valve may be a progressive valve that may include a plurality of valve positions between open and closed. This may provide advantages for air control and may be less disruptive to throttle-regulated air flow rate. For example, the ejector motive flow control valve may be configured to be open during high load conditions (where the throttle is open and intake manifold vacuum is low) and closed during conditions where the throttle is closed and intake manifold vacuum is high. However, when the throttle is between wide open and fully closed, the flow control valve may be partially open depending on the position of the throttle.

Figure 13:
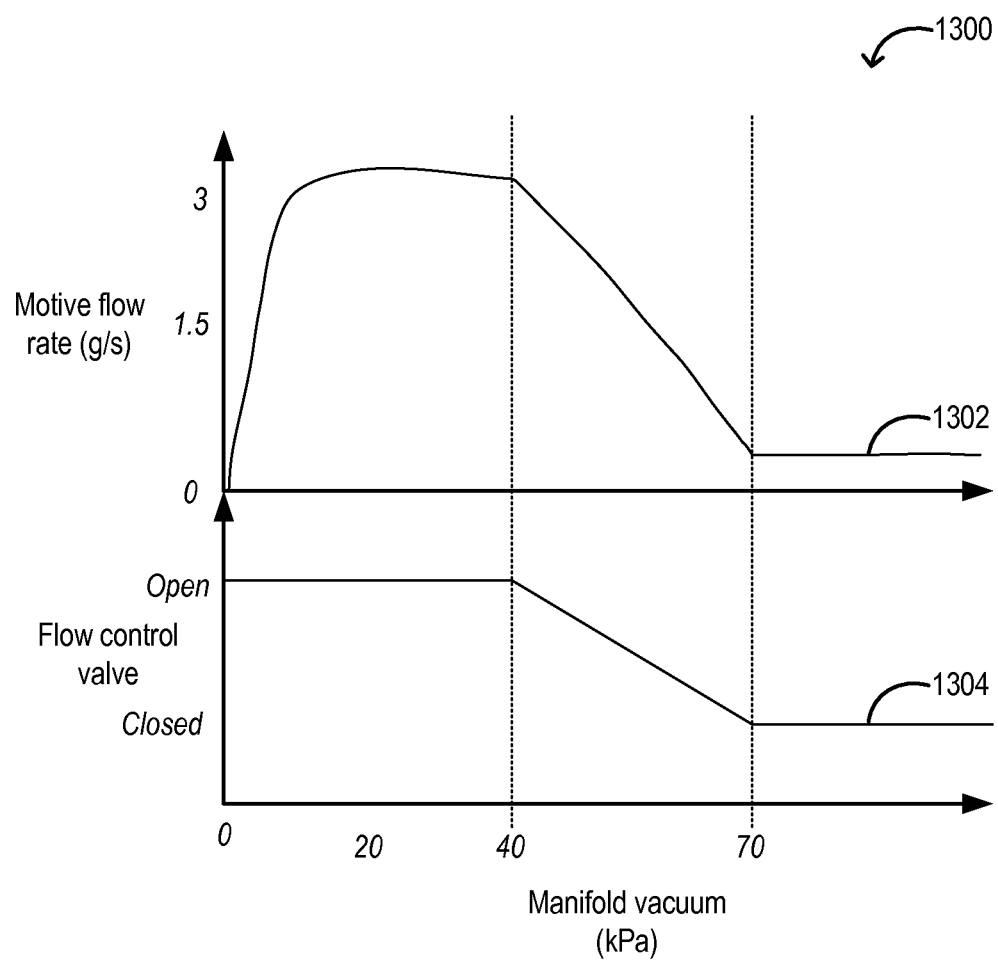
FIG. 13 shows example parameters of a progressively-controlled valved ejector.

One example of flow control valve position as a function of intake manifold pressure for a progressive valve is depicted in FIG. 13. FIG. 13 is a diagram 1300 illustrating motive flow rate and flow control valve position as a function of intake manifold vacuum. As shown by curve 1304, when intake manifold pressure is less than a threshold (e.g., 40 kPa) the flow control valve is open. At the threshold pressure, the flow control valve begins to close in a progressive manner. For example, it may close linearly with the change in intake manifold pressure. Then, at a second threshold pressure (e.g., 70 kPa) the valve is fully closed. Curve 1302 illustrates an example motive flow rate that results from the action of the progressive motive flow control valve coupled in series with an ejector. When the valve is open, the motive flow rate increases to an upper threshold, such as 3 gallons/second. When the valve starts to close, the motive flow rate decreases linearly with the change in valve position until a lower threshold rate is reached (e.g., 0.1 g/s) when the valve is fully closed. By including a progressively opening/closing valve rather than on/off valve, sudden valve opening or closing due to slight changes in intake manifold vacuum can be avoided.

A fourth, still further embodiment 400 is shown at FIG. 4. In the depicted embodiment, vacuum-actuated valve 150 is again directly coupled to vacuum reservoir 38 with no intermediate solenoid valve. However, in the depicted configuration, a neck of the ejector is coupled to the vacuum reservoir along first passage 82, an outlet of the ejector is coupled to the vacuum reservoir along second passage 84, the second passage further coupling the vacuum reservoir to an engine intake manifold downstream of a juncture with the ejector outlet, each of the first and second passages including a check valve. Herein, the vacuum-actuated valve is coupled to the throttle body in a manner known as a "ported throttle". A passage is placed into the throttle bore such that, depending on throttle position, the port is exposed to either high pressure pre-throttle air or low pressure post-throttle air. When the throttle is in the most closed position (e.g., as shown at 410), the port is exposed to high vacuum and the ejector motive flow control valve closes. While it may be desirable to connect the much larger motive flow to this throttle port, the motive flow area required is much larger than can be practically accommodated. This throttle port is a small signal port, not a large passage that accommodates the flow of a large ejector. When the throttle opens 4 to 7° (e.g., as shown at 412), the port is exposed to high pressure pre-throttle air and the ejector motive flow control valve opens. The depicted implementation results in the vacuum-actuated valve opening when intake throttle angle is off and the valve closing when the intake throttle is near an idle-stop position. This configuration also enables synergistic benefits with throttle control and air flow control. Specifically, when the intake throttle 22 is near a closed position and is at risk of running out of authority (that is, hitting the closed stop position), the intake manifold vacuum is high and motive flow is not required. During these very conditions, the vacuum-actuated valve is closed and motive flow is not provided, thereby overcoming airflow errors and related disturbances. Further, by closing the vacuum-actuated valve, throttle authority over low engine air flow rates is restored.

As such, there may be concerns that the opening and closing of the valved ejector may cause a disturbance that cannot be sufficiently rejected by controller 50. To address this, a fifth, yet further embodiment 500, as shown at FIG. 5, may be implemented. In the depicted embodiment, vacuum-actuated valve 150 is again directly coupled to vacuum reservoir 38 with no intermediate solenoid valve. The depicted embodiment shows the valve in an open position since it is exposed to low vacuum. In the depicted configuration, the vacuum-actuated valve 150 may be coupled to the vacuum reservoir via two vacuum passages 502 and 504, each of the passages 502, 504 including respective orifices 512, 514 for tuning the rates of valve actuation. In particular, first orifice 512 positioned in first vacuum passage 502, downstream of check valve 92, may govern the opening time of valve 150 while second orifice 514 positioned in second passage 504, upstream of check valve 94 governs the closing time of valve 150. By including an orifice in the passages 502, 504 coupled between the vacuum reservoir 38 and the vacuum-actuated valve 150, the opening and closing of the vacuum-actuated valve is slowed down. In doing so, air flow disturbances arising during opening or closing of the ejector valve can be reduced.

It will be appreciated that while the depicted embodiment uses orifices to tune the valve actuation rates, in alternate embodiments, the disturbances may be addressed by including a position sensor coupled on to the vacuum-actuated valve. When included, the position sensor may be coupled to the vacuum actuator of the vacuum-actuated valve (such as to actuator 151 of valve 150 at FIG. 1). Alternatively, the position sensor may be coupled to the valve's solenoid, such as vacuum vent solenoid 170 of FIG. 1. Independent of actuation technology, the position sensor may be configured to feed data regarding the position of the valve to the engine controller so that air flow disturbances can be appropriately and more accurately compensated for. This is because with the position sensor, an opening and closing of the pneumatic motive flow control valve may not be knowable as it is based on the vacuum reservoir's vacuum level. In other words, vacuum measurement (e.g., booster vacuum measurement) may be additionally required to determine the position of the vacuum-actuated valve 150. Herein, by having a position sensor coupled to vacuum vent solenoid 170 or vacuum actuator 151, the position sensor may be used by an engine controller's air charge management system to be aware of the state of this flow passage into the intake manifold.

It will be appreciated that, when include, the position sensor is also reflective of the reservoir vacuum level. For example, where the reservoir is coupled to a brake booster, the position sensor is also reflective of brake booster vacuum, albeit at a lower fidelity than a conventional vacuum sensor, such as vacuum sensor 40. However, the position sensor may still be capable of registering essentially a binary signal indicative of either a first condition where the vacuum-actuated motive flow control valve is open due to insufficient brake booster vacuum, or a second condition where the vacuum-actuated motive flow control valve is closed due to sufficient brake booster vacuum. While this data alone may be insufficient to trigger hydraulic brake assist (in the event that vacuum brake assist becomes unavailable), it can be used as enhancing data in a model of brake booster vacuum. Further, while the example is explained in the context of a brake booster vacuum reservoir, the same may be applicable to other vacuum reservoirs coupled to alternate engine vacuum consumers, such as a charge motion control valve (CMCV) vacuum reservoir (as discussed herein at FIG. 7).

In still further embodiments, where the engine system includes each of a vacuum sensor coupled to a vacuum reservoir (such as vacuum sensor 40 coupled to a brake booster) and a position sensor coupled to the vacuum-actuated motive flow control valve 150, the sensors may be used for diagnostic purposes. Specifically, it would relieve the need to infer true ejector motive flow control valve position from intake manifold pressure or fuel flow rate combined with air-fuel ratio (AFR) feedback.

As such, the adjustments to the motive flow rate through the ejector may not substantially affect air flow rate change. However, in all the depicted embodiments, the adjustments to the motive flow rate through the ejector may be compensated for by corresponding adjustments to intake throttle 22. By performing corresponding adjustments, an air flow to the engine intake manifold is maintained at a desired level. As an example, responsive to a closing of the vacuum-actuated valve to decrease motive flow through the ejector, an opening of the intake throttle may be correspondingly increased (e.g., the intake throttle may be moved to a more open position). Likewise, responsive to an opening of the vacuum-actuated valve to increase motive flow through the ejector, an opening of the intake throttle may be correspondingly decreased (e.g., the second throttle may be moved to a more closed position).

Figure 10:
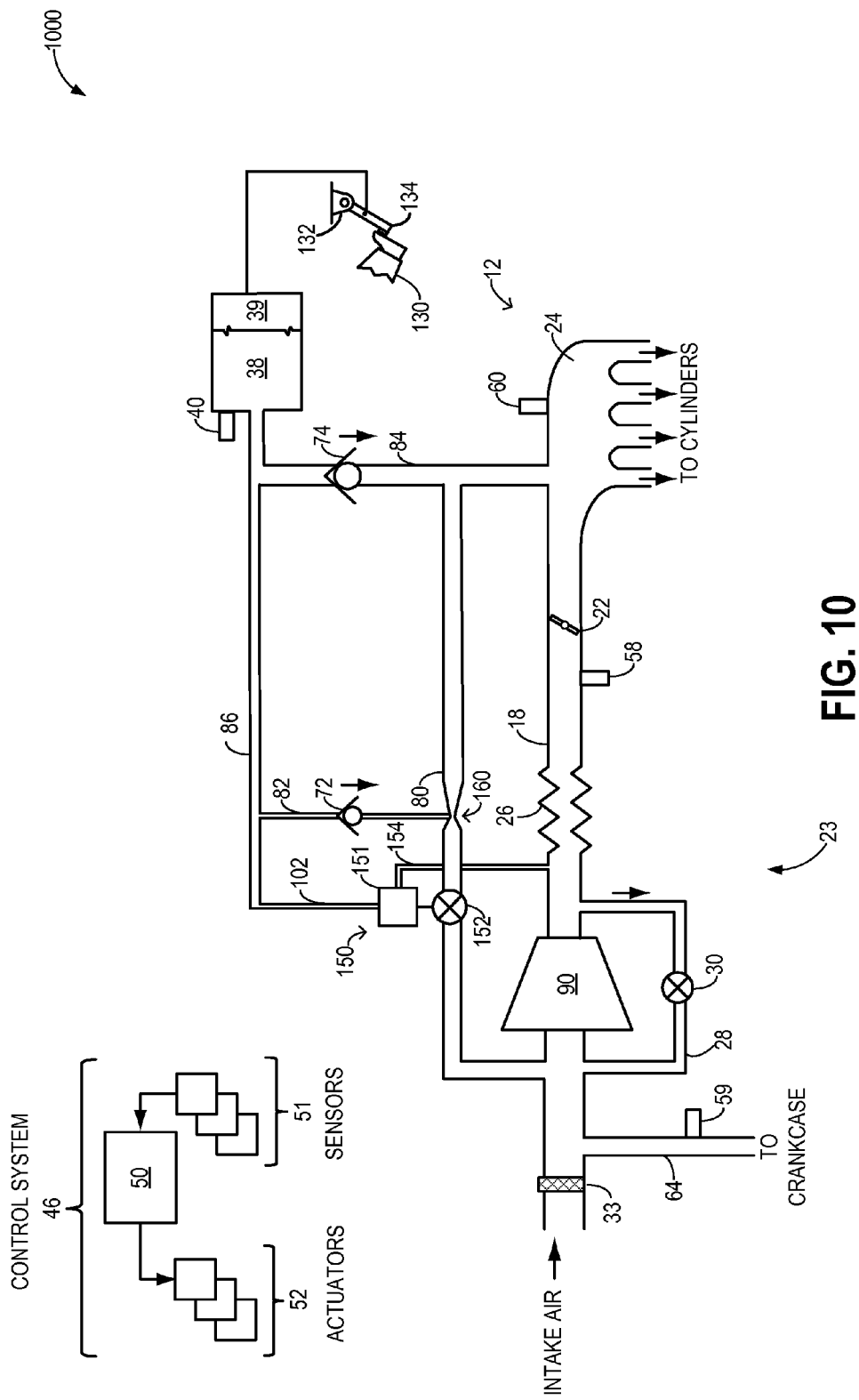
FIG. 10 shows an alternate embodiment of an engine system including a valved ejector.

A sixth, still further embodiment 1000 is shown at FIG. 10. In the depicted embodiment, vacuum-actuated valve 150 is directly coupled to vacuum reservoir 38 with no intermediate solenoid valve. As depicted, a neck of the ejector 160 is coupled to the vacuum reservoir 38 along first passage 82, while an outlet of the ejector 160 is coupled to the vacuum reservoir 38 along second passage 84 and while the vacuum-actuated valve 150 is directly coupled to the vacuum reservoir 38 along third passage 102 without an intervening vacuum vent solenoid 170. Each of the first, second, and third passages may then merge at fourth passage 86, downstream (in the direction of flow) of an outlet of the vacuum reservoir. Each of the first and second passages includes respective check valves to control flow direction to/from the reservoir. The second passage 84 further couples the vacuum reservoir 38 to the engine intake manifold 24 downstream (in the direction of flow) of a juncture with the ejector outlet.

Additionally, rather than venting vacuum-actuated valve 150 to atmosphere via vent 153, as described in the previous embodiments, in embodiment 1000, the vacuum-actuated valve 150 is vented to intake passage 18 via vent 154. Vent 154 fluidically couples vacuum-actuated valve 150 to the intake passage 18 downstream of the compressor 90 and upstream of the charge air cooler 26 and intake throttle 22.

The depicted implementation results in the vacuum-actuated valve opening when vacuum levels in the vacuum reservoir are low and the valve closing when vacuum levels in the vacuum reservoir are high. Further, because the vacuum-actuated valve is vented to the intake passage downstream of the compressor, high boost pressure also results in the vacuum-actuated valve closing. As an example, the vacuum-actuated valve may open in response to low brake booster vacuum and close in response to one or more of high boost pressure and high brake booster vacuum. It will be appreciated that while the depicted embodiments are described using a brake booster as the vacuum consumer, in alternate embodiments, an alternate engine vacuum consumer may be substituted. For example, the vacuum reservoir may be coupled to one or more of a brake booster, a purge canister, a charge motion control valve, crankcase ventilation, and a turbine wastegate. Further still, any vacuum reservoir may be substituted. In this way, by coupling the valve directly to the vacuum reservoir, and adjusting the opening of the vacuum-actuated valve based on the vacuum level of the vacuum reservoir, the ejector valve may be actuated open when the vacuum reservoir needs replenishment. Further, during conditions of high boost pressure, regardless of the level of vacuum at the vacuum reservoir, the valve will be closed to reduce loss of boost from backflow through the ejector.

Figure 8:
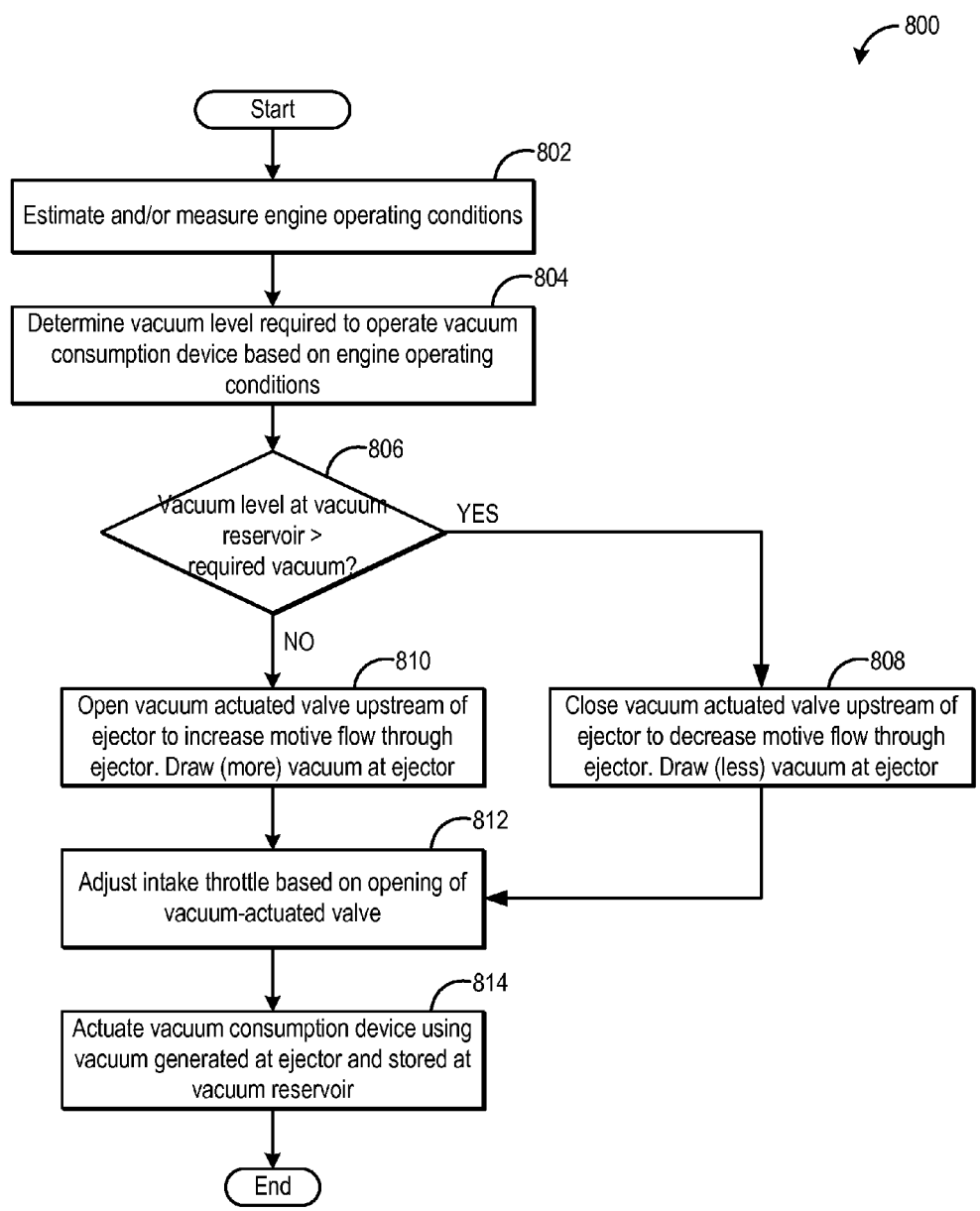
FIG. 8 shows a high level flow chart illustrating a routine that may be implemented for controlling the operation of the vacuum-actuated valve (or throttle) to adjust a motive flow rate through the ejector.
Figure 11:
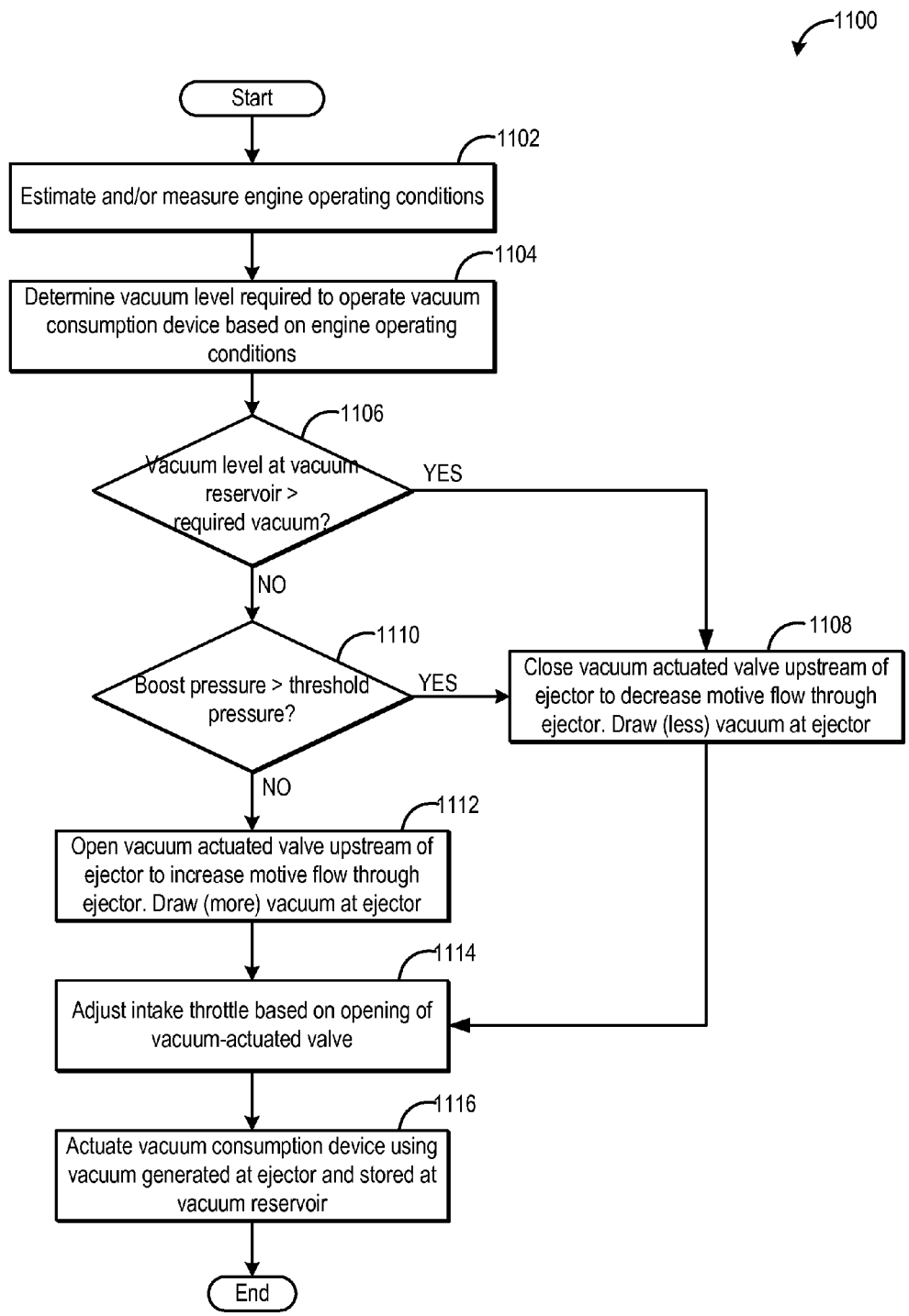
FIG. 11 is a flow chart illustrating a routine for controlling the operation of the vacuum-actuated valve of FIG. 10.

Returning to FIG. 1, engine system 10 may also include a control system 46 including a controller 50, sensors 51 and actuators 52. Example sensors include mass air flow sensor 58, manifold air pressure sensor 60, crankcase vent tube pressure sensor 59, and vacuum sensor 40. Example actuators include engine valves, CBV 30, intake throttle 22, and vacuum vent solenoid 170. Controller 50 may further include a physical memory with instructions, programs and/or code for operating the engine. An example routine executed by controller 50 is shown at FIGS. 8 and 11. Now turning to FIG. 6, a sectional view 600 of the vacuum-actuated valve 150 of FIGS. 1-5 and 10, which controls motive flow through the ejector 160, is shown. Valve 150 includes a horizontal passage 602 with a converging inlet 601 coupled to the intake passage and configured to receive filtered air from downstream of the compressor and charge air cooler. Horizontal passage 603 further includes a diverging outlet 604 coupled to an ejector and then to the intake manifold 24 (or other low pressure node). Outlet 604 may be a gradually diverging conic section. In one example, outlet 604 may diverge at an angle in the range of 5° to 10°. Valve 150 further includes a vertical passage 608 extending through the horizontal passage at a juncture 612 of the inlet and the outlet (which may alternatively be referred to as a gap between the inlet and the outlet). A diameter of outlet 604 at juncture 612 may be slightly larger than, or the same as, a diameter of inlet 601 at juncture 612. In one example, the diameter of the inlet at the juncture may be 8.0 mm, and the diameter of the outlet at the juncture may be 9 mm. In another example, the diameter of inlet 601 may be 12 mm, a diameter of outlet 604 at juncture 612 may be 8 mm, and a diameter of horizontal passage may be 8 to 12 mm. The valve may further include a vent 606 that couples the cylinder volume to the inlet 604. The vent exposes the bottom of the piston to an air pressure higher than the vacuum applied at 622. The vent may also be connected to 604, to the intake passage downstream of the compressor, or the vent may be connected to the intake manifold. If connected to the intake passage downstream of the compressor or to the intake manifold, a boosted pressure in the intake passage or manifold tends to put a high pressure on the bottom of the piston which tends to close the valve. This may be useful to prevent reverse flow through the valve 150 during boosted operation. While trying to build boost, such as during a vehicle launch from a stopped position, leaking boost out is undesirable as it may cause a lag in vehicle launch. However, once boost is established, leaking out boost may add surge margin to the compressor, which is desirable.

Valve 150 may be configured as a gate valve while its actuator may be configured as a piston or a diaphragm. FIG. 6 shows the gate valve in the closed position. Optionally, instead of using a piston ring to seal to the cylinder wall, the piston only fully seals when it is in either extreme position. As such, by not using a piston seal, sealing problems associated with a piston seal are reduced. In the depicted embodiment, the flow area of the gate valve is narrowed at juncture 612, similar to a venturi, so as to reduce the opening force required when the valve is closed and when a high pressure difference (delta P) exists across the valve. By narrowing the flow area gently and modestly, the geometry's pressure recovery is near 100%, thus not causing significant pressure drop across the valve when the valve is open. It will be appreciated that in alternate embodiments, the gate valve may cover the whole flow area without narrowing the flow area at the gate.

An actuator 613 coupled to vertical passage 608 controls a position of gate 610 which is vertically extendable/retractable in the vertical passage. Actuator 613 includes spring 616 in compression. Actuator 613 further includes an opening 614 in the blade of the gate valve. Thus, by varying a compression of spring 616, a position of gate 610 and opening 614, relative to juncture 612, may be changed. Since the valve is vacuum-actuated, actuator 613 may be coupled to a vacuum source (such as a vacuum reservoir) via vacuum port 622. By coupling the actuator to a vacuum source via vacuum port 622, vacuum may be applied to increase compression of springs 616, thereby moving gate 610 further into vertical passage 608, and closer to juncture 612, so as to close valve 150. Specifically, when the vacuum force exceeds the spring force, the gate valve retracts. O-ring seals 618 may be included in vertical passage 608 immediately above and below block 620, which surrounds compression springs 616, to prevent leakage of motive flow into the vacuum reservoir when the ejector is fully closed.

As such, gate valves tend to drag when there is a pressure difference across them. Resistance to motion (coulomb friction or stiction) adds hysteresis to the valve motion, as shown at plot 650. Therein, a slope on the position vacuum curves due to the variable spring force (as the spring compresses, its force increases). In some embodiments, the friction can increase with a pressure differential across the valve, producing a hysteretic behavior as shown at plot 655. However, the resulting hysteretic behavior (as shown at plots 650 or 655), serendipitously, is advantageous for minimizing valve transitions which may otherwise tend to wear the valve.

It will be appreciated that while the depicted embodiment shows valve 150 as a gate valve, in alternate embodiments, the valve may be a balanced force valve. These may include, for example, throttles (pivoting disks) and poppet valves with equal pressure on each side of the valve.

FIG. 7 shows a further embodiment 700 of the engine system of FIG. 1 wherein the vacuum-actuated valve includes a rotational vacuum actuator instead of a linear vacuum actuator (as used in the embodiments of FIGS. 1-5) and wherein the valve further includes a pivoting disk instead of a gate valve. Herein, the vacuum-actuated valve is a vacuum-actuated throttle valve.

In the embodiment of FIG. 7, valve 150 includes a first rotational vacuum actuator 704 coupled to a throttle 702. As such, throttle 702 of valve 150 may be smaller in diameter than intake throttle 22. For example, throttle 702 may have a diameter of 12 mm while intake throttle 22 has a diameter of 80 mm. As with the other embodiments, the throttle 702 and actuating diaphragm of valve 150 may cause the valve to close when exposed to high reservoir vacuum. When the vacuum port of first rotational vacuum actuator 704 is exposed to low vacuum levels of vacuum reservoir 38, throttle 702 is opened, increasing motive flow through ejector 160.

In addition to first rotational vacuum actuator 704, a vacuum vent solenoid 708 may also be coupled to the vacuum reservoir 38. The vacuum vent solenoid 708, however, may not be coupled between the vacuum reservoir 38 and the first rotational vacuum actuator 704. Rather, the vacuum vent solenoid 708 may be coupled along conduit 706 to a second rotational vacuum actuator 714. This second rotational vacuum actuator 704 may, in turn, be coupled to a charge motion control valve (CMCV) 716. CMCV 716 includes a stem coupled to multiple throttle 718, each throttle positioned within a distinct port of the intake manifold. Thus, based on the vacuum level of the reservoir, vacuum vent solenoid 7108 may actuate second rotational vacuum actuator 714, thereby adjusting a position CMCV 716. As such, by moving CMCV 716, an amount of intake manifold vacuum generated can be varied. Further, intake air flow adjustments may be made.

Now turning to FIG. 8, an example routine 800 is shown for operating the vacuum-actuated valve of FIGS. 1-7. The routine enables the valve to be actuated responsive to engine vacuum needs so as to control motive flow through a downstream ejector. By adjusting the valve to increase motive flow through the ejector during low vacuum conditions, more vacuum can be generated at the ejector for use by engine vacuum consumption devices.

At 802, the routine includes estimating and/or measuring engine operating conditions. These include, for example, engine speed, engine temperature, atmospheric conditions (temperature, BP, humidity, etc.), boost level, desired torque, EGR, etc.

At 804, based on the estimated engine operating conditions, a vacuum level required to operate one or more vacuum consumption devices may be determined. For example, a vacuum level required to provide a brake assist via a brake booster may be determined. As another example, a vacuum level required to actuate a wastegate for boost control may be determined. As still another example, a vacuum level required to fully purge a fuel system canister may be determined. As yet another example, a vacuum level required to actuate a CMCV may be determined.

At 806, it may be determined if the vacuum level in a vacuum reservoir is sufficient to meet the vacuum requirement of the vacuum consumption device. For example, a vacuum level at a brake booster vacuum reservoir may be estimated and it may be determined if there is sufficient vacuum for providing brake assist. As another example, a vacuum level at a waste gate vacuum reservoir may be estimated and it may be determined if there is sufficient vacuum for actuating the turbine wastegate. As yet another example, a vacuum level at a vacuum reservoir coupled to a CMCV may be estimated, and it may be determined if there is sufficient vacuum for actuating the CMCV. Similarly, the vacuum level at various other engine vacuum consumers may be estimated. Further still, in embodiments where the engine includes a common vacuum reservoir, the vacuum level of the common vacuum reservoir may be estimated.

While the routine depicts determining if there is sufficient vacuum in the vacuum reservoir to meet the engine vacuum demand, in still other examples, an amount of intake manifold vacuum that is available under the prevalent operating conditions may also be estimated. Therein, it may be determined if there is sufficient vacuum in the vacuum reservoir to supplement the intake manifold vacuum in meeting the vacuum demand of the various vacuum consumers.

If yes, then at 808, the routine includes closing the vacuum-actuated valve upstream of the ejector to decrease motive flow through the ejector. It will be appreciated that in some embodiments, the motive flow control valve needs merely be in series with the ejector. Thus, positioning the valve downstream also would work and in the most idealized concept, would be functionally equivalent, albeit not practically preferred. As a result of the reduced motive flow, less vacuum may be drawn at the ejector. Closing the vacuum-actuated valve may include the controller actuating a vacuum vent solenoid coupled between the vacuum-actuated valve and a vacuum reservoir in response to the high vacuum levels at the reservoir. Alternatively, closing the valve may include the valve closing due to (direct) exposure to high vacuum levels at the vacuum reservoir. Therein, the vacuum force applied on the valve by the vacuum reservoir may overcome the spring force of the valve's compression springs, enabling the valve to be closed. Closing the valve may include fully closing the valve or moving the valve to a more closed position. In this way, during high vacuum conditions, when vacuum does not need to be replenished, a vacuum-actuated motive flow controlling valve positioned upstream of an ejector can be closed to decrease motive flow through, and vacuum generation at, the ejector.

While adjusting the closing the of the motive flow controlling valve, at 812, the routine includes adjusting an intake throttle based on the position of the vacuum-actuated valve to reduce air-flow disturbances and maintain air flow conditions. At 814, the available vacuum may then be used to actuate and operate the vacuum consumption device(s) coupled to the vacuum reservoir.

In comparison, if there is not sufficient vacuum in the vacuum reservoir (at 806), then at 810, the routine includes opening the vacuum-actuated valve upstream of the ejector to increase motive flow through the ejector. As a result of the increased motive flow, more vacuum may be drawn at the ejector. Opening the vacuum-actuated valve may include the controller actuating a vacuum vent solenoid coupled between the vacuum-actuated valve and a vacuum reservoir in response to the low vacuum levels at the reservoir. Alternatively, opening the valve may include the valve opening due to (direct) exposure to low vacuum levels at the vacuum reservoir. Therein, the vacuum force applied on the valve by the vacuum reservoir may not overcome the spring force of the valve's compression springs, enabling the valve to remain open. Opening the valve may include fully opening the valve or moving the valve to a more open position. In this way, during low vacuum conditions, when vacuum needs to be replenished, a vacuum-actuated motive flow controlling valve positioned upstream of an ejector can be opened to increase motive flow through, and vacuum generation at, the ejector.

While adjusting the opening the of the motive flow controlling valve, the intake throttle may be adjusted (at 812) based on the position of the vacuum-actuated valve to reduce air-flow disturbances and maintain air flow conditions. Then, the vacuum generated at the ejector and stored in the reservoir may be used (at 814) to actuate and operate the vacuum consumption device(s) coupled to the vacuum reservoir.

In one example, adjusting an opening of the vacuum-actuated valve includes increasing the opening of the vacuum-actuated valve in response to the vacuum level at the coupled vacuum reservoir being lower than a threshold, and drawing vacuum at the ejector until the vacuum level at the vacuum reservoir is above the threshold. Then, after the vacuum level at the vacuum reservoir is above the threshold, the vacuum-actuated valve can be closed. Therein, adjusting the intake throttle while adjusting the valve may include, while increasing the opening of the vacuum-actuated valve, adjusting an opening of the intake throttle, to maintain intake air flow rate.

Figure 9:
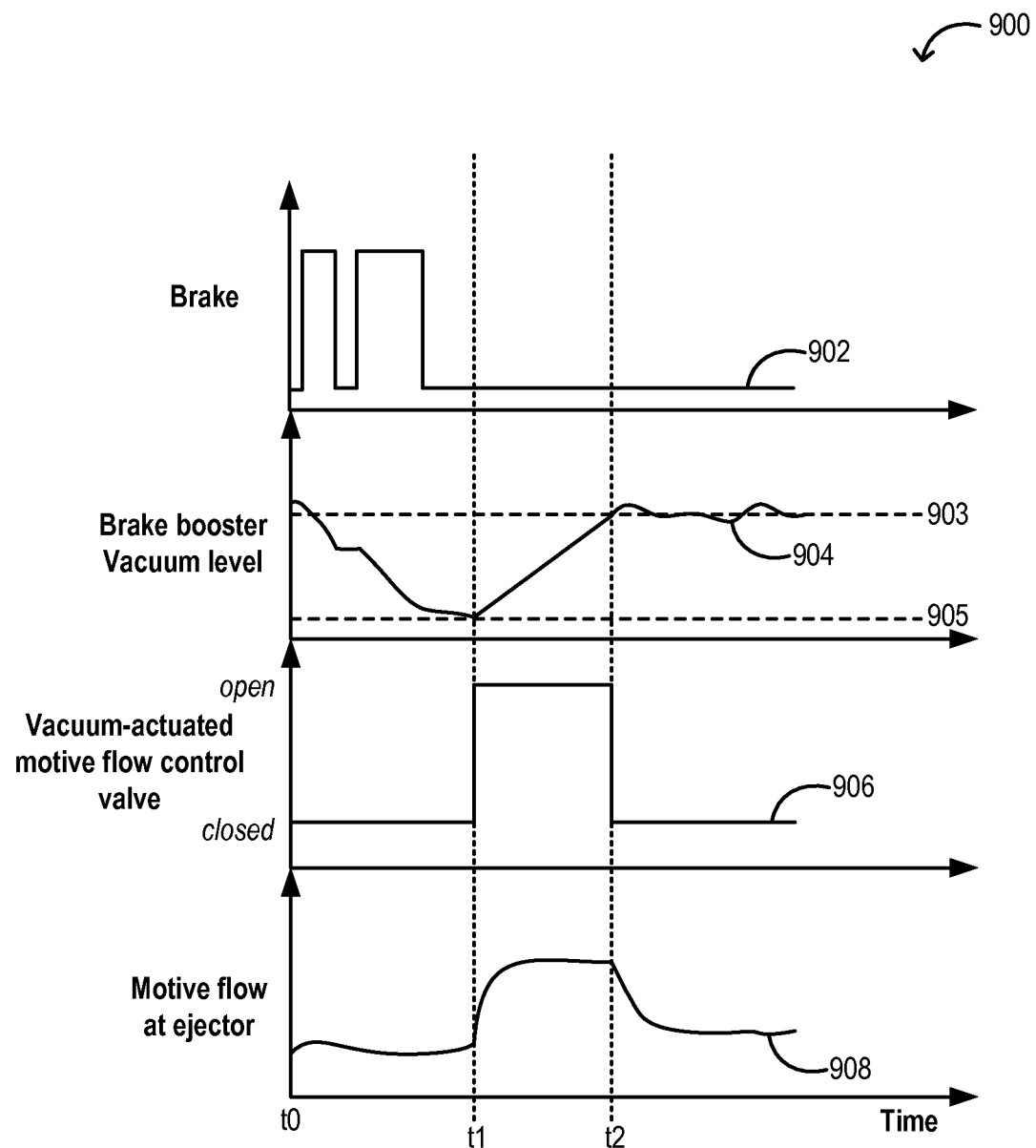
FIG. 9 shows example valve adjustments performed to vary motive flow through and vacuum generation at an ejector.

An example adjustment is now shown with reference to FIG. 9. Map 900 depicts brake pedal application at plot 902, changes in a brake booster vacuum level at plot 904, an opening or closing of the vacuum-actuated motive flow control valve at plot 906, and changes to motive flow at the ejector at plot 908.

At t0, a vacuum level at the brake booster vacuum reservoir may be higher than a valve closing threshold 903. In response to the high vacuum level, the vacuum-actuated motive flow control valve upstream of the ejector may be actuated closed (plot 906), thereby reducing motive flow through the ejector (plot 908). Between t0 and t1, the brake pedal may be applied multiple times (plot 902). As such, since the brake booster is a vacuum-actuated device, with each application of the brake pedal, vacuum may be dissipated from the brake booster vacuum reservoir such that by t1, the vacuum level at the reservoir is below valve opening threshold 905. As depicted, valve opening threshold 905 may correspond to a lower level of vacuum than valve closing threshold 903.

In response to the low vacuum level, at t1, the vacuum actuated valve may be actuated open (plot 906). Specifically, the low vacuum force may not be sufficient to overcome the compression force of the valve's springs, causing the valve to open. As a result of the valve being opened, motive flow through the ejector may increase and vacuum may be generated at the ejector. Between t1 and t2, vacuum may continue to be drawn and the drawn vacuum may be stored at the vacuum reservoir. That is, between t2 and t3, the reservoir may be replenished with vacuum.

At t2, the vacuum level at the reservoir may rise above valve closing level 903. In response to the high vacuum level, the vacuum actuated valve may be actuated close (plot 906). Specifically, the high vacuum force may overcome the compression force of the valve's springs, causing the valve to close. As a result of the valve being closed, motive flow through the ejector may decrease and vacuum generation at the ejector may be reduced (or stopped). In this way, an opening of a vacuum-actuated valve coupled upstream of an ejector may be adjusted to vary a motive flow through the ejector, where the ejector is coupled across an intake throttle, the valve coupled to a vacuum reservoir.

In some embodiments, the vacuum-actuated valve of FIGS. 1-7 may be opened or closed so as to operate the engine system in different modes based on the engine vacuum requirements. As one example, an engine system may comprise an engine including an intake manifold, the intake manifold coupled to a vacuum reservoir along a first passage; an intake throttle upstream of the intake manifold; an ejector positioned in a bypass passage across the intake throttle, a neck of the ejector coupled to the vacuum reservoir along a second passage, an outlet of the ejector coupled to the vacuum reservoir and the intake manifold along the first passage. The engine system may further include a vacuum-actuated valve coupled in the bypass passage upstream of an inlet of the ejector, the vacuum-actuated valve coupled to the vacuum reservoir. An engine controller may be configured with computer-readable instructions for operating the engine system in a first mode with the vacuum-actuated valve open to increase motive flow through the ejector. The controller may further include instructions for operating the engine system in a second mode with the vacuum-actuated valve closed to decrease the motive flow. The engine system may be operated in the first mode when a vacuum level in the vacuum reservoir is below a threshold and operated in the second mode when the vacuum is above the threshold. The operating in the first mode may be continued until the vacuum level is higher than the threshold. Then, engine system operation may be transitioned from the first mode to the second mode after the vacuum level is higher than the threshold level.

In another example, a method for controlling motive flow through an ejector includes, when vacuum level at a vacuum reservoir is lower than a threshold, operating in a first mode with a vacuum-actuated valve located upstream of the ejector open to increase the motive flow; and when vacuum level at the vacuum reservoir is higher than the threshold, operating in a second mode with the vacuum-actuated valve closed to decrease the motive flow. Herein, operating in the first mode includes operating in the first mode until the vacuum level is higher than the threshold, the method further comprising, transitioning to operating in the second mode after the vacuum level is higher than the threshold level.

In this way, a motive flow control valve may be pneumatically controlled to vary motive flow through an ejector. By actuating the valve using a vacuum source, the opening and closing of the valve may be adjusted based on vacuum requirements. In particular, during low vacuum conditions, when a vacuum source needs to be replenished, the vacuum-actuated valve may be opened to increase motive flow at the ejector, and draw more vacuum from the ejector. Then, high vacuum conditions, when the vacuum source does not need to be replenished, the vacuum-actuated valve may be closed to decrease motive flow at the ejector, and draw less vacuum from the ejector. The approach enables vacuum needs to be met by varying motive flow without degrading an intake throttle's ability to establish a low airflow rate during idling conditions. Overall, vacuum generation efficiency is increased at low component cost and complexity.

Now turning to FIG. 11, an example routine 1100 is shown for operating the vacuum-actuated valve of FIG. 10. The routine enables the valve to be actuated responsive to engine vacuum needs so as to control motive flow through a downstream ejector. By adjusting the valve to increase motive flow through the ejector during low vacuum conditions, more vacuum can be generated at the ejector for use by engine vacuum consumption devices. Further, the valve may also be actuated responsive to engine boost pressure to prevent boost loss during conditions of high boost pressure.

At 1102, the routine includes estimating and/or measuring engine operating conditions. These include, for example, engine speed, engine temperature, atmospheric conditions (temperature, BP, humidity, etc.), boost level, desired torque, EGR, etc.

At 1104, based on the estimated engine operating conditions, a vacuum level required to operate one or more vacuum consumption devices may be determined. For example, a vacuum level required to provide a brake assist via a brake booster may be determined. As another example, a vacuum level required to actuate a wastegate for boost control may be determined. As still another example, a vacuum level required to fully purge a fuel system canister may be determined. As yet another example, a vacuum level required to actuate a CMCV may be determined.

At 1106, it may be determined if the vacuum level in a vacuum reservoir is sufficient to meet the vacuum requirement of the vacuum consumption device. For example, a vacuum level at a brake booster vacuum reservoir may be estimated and it may be determined if there is sufficient vacuum for providing brake assist. As another example, a vacuum level at a waste gate vacuum reservoir may be estimated and it may be determined if there is sufficient vacuum for actuating the turbine wastegate. As yet another example, a vacuum level at a vacuum reservoir coupled to a CMCV may be estimated, and it may be determined if there is sufficient vacuum for actuating the CMCV. Similarly, the vacuum level at various other engine vacuum consumers may be estimated. Further still, in embodiments where the engine includes a common vacuum reservoir, the vacuum level of the common vacuum reservoir may be estimated.

While the routine depicts determining if there is sufficient vacuum in the vacuum reservoir to meet the engine vacuum demand, in still other examples, an amount of intake manifold vacuum that is available under the prevalent operating conditions may also be estimated. Therein, it may be determined if there is sufficient vacuum in the vacuum reservoir to supplement the intake manifold vacuum in meeting the vacuum demand of the various vacuum consumers.

If yes, then at 1108, the routine includes closing the vacuum-actuated valve upstream of the ejector to decrease motive flow through the ejector. It will be appreciated that in some embodiments, the motive flow control valve needs merely be in series with the ejector. Thus, in some embodiments the motive flow control valve may be positioned downstream of the ejector. As a result of the reduced motive flow, less vacuum may be drawn at the ejector. Closing the valve may include the valve closing due to (direct) exposure to high vacuum levels at the vacuum reservoir. Therein, the vacuum force applied on the valve by the vacuum reservoir may overcome the spring force of the valve's compression springs, enabling the valve to be closed. Closing the valve may include fully closing the valve or moving the valve to a more closed position. In this way, during high vacuum conditions, when vacuum does not need to be replenished, a vacuum-actuated motive flow controlling valve positioned upstream of an ejector can be closed to decrease motive flow through, and vacuum generation at, the ejector. However, in some embodiments, closing the vacuum-actuated valve may include the controller actuating a vacuum vent solenoid coupled between the vacuum-actuated valve and a vacuum reservoir in response to the high vacuum levels at the reservoir.

While adjusting the closing the of the motive flow controlling valve, at 1114, the routine includes adjusting an intake throttle based on the position of the vacuum-actuated valve to reduce air-flow disturbances and maintain air flow conditions. At 1116, the available vacuum may then be used to actuate and operate the vacuum consumption device(s) coupled to the vacuum reservoir.

In comparison, if there is not sufficient vacuum in the vacuum reservoir (at 1106), then at 1110, the routine includes determining if boost pressure is greater than a threshold pressure. Boost pressure may be determined based on output from one or more sensors of the engine, such as pressure sensor 58 and/or sensor 60, and/or based on operating conditions (such as engine speed and load, turbine wastegate position, etc.). The threshold level of boost pressure may be an amount of pressure in the intake passage and/or intake manifold that would cause airflow through conduit 80 to reverse direction. That is, the threshold pressure level may include intake manifold pressure, intake passage pressure, and/or compressor outlet pressure that is greater than compressor inlet pressure. This increased pressure differential across the compressor causes air from the intake manifold to flow through the conduit 80 and ejector 160 before reaching the inlet of the compressor. Such airflow may reduce the building of boost pressure.

Thus, if boost pressure is greater than the threshold, the routine proceeds to 1108 to close the vacuum actuated valve, as explained above. The vacuum-actuated valve according to the configuration of FIG. 10 may be exposed to air downstream of the compressor (e.g., at the compressor outlet). During boosted conditions, the air at the compressor outlet may be of greater pressure than the spring force acting on the valve, and thus the valve may be actuated closed. When boost pressure is greater than the threshold, the vacuum-actuated valve may be actuated to a fully closed or partially closed position. Upon closing the valve, the routine proceeds to 1114, as explained above.

If boost pressure is not above the threshold (e.g., if the engine is not operating with boost, such that intake manifold pressure is not greater than barometric pressure), the routine opens the vacuum-actuated valve upstream of the ejector to increase motive flow through the ejector at 1112. As a result of the increased motive flow, more vacuum may be drawn at the ejector. Opening the valve may include the valve opening due to (direct) exposure to low vacuum levels at the vacuum reservoir. Therein, the vacuum force applied on the valve by the vacuum reservoir may not overcome the spring force of the valve's compression springs, enabling the valve to remain open. Opening the valve may include fully opening the valve or moving the valve to a more open position. In this way, during low vacuum conditions, when vacuum needs to be replenished, a vacuum-actuated motive flow controlling valve positioned upstream of an ejector can be opened to increase motive flow through, and vacuum generation at, the ejector. In some embodiments, opening the vacuum-actuated valve may include the controller actuating a vacuum vent solenoid coupled between the vacuum-actuated valve and a vacuum reservoir in response to the low vacuum levels at the reservoir.

While adjusting the opening the of the motive flow controlling valve, the intake throttle may be adjusted (at 1114) based on the position of the vacuum-actuated valve to reduce air-flow disturbances and maintain air flow conditions. Then, the vacuum generated at the ejector and stored in the reservoir may be used (at 1116) to actuate and operate the vacuum consumption device(s) coupled to the vacuum reservoir.

Figure 12:
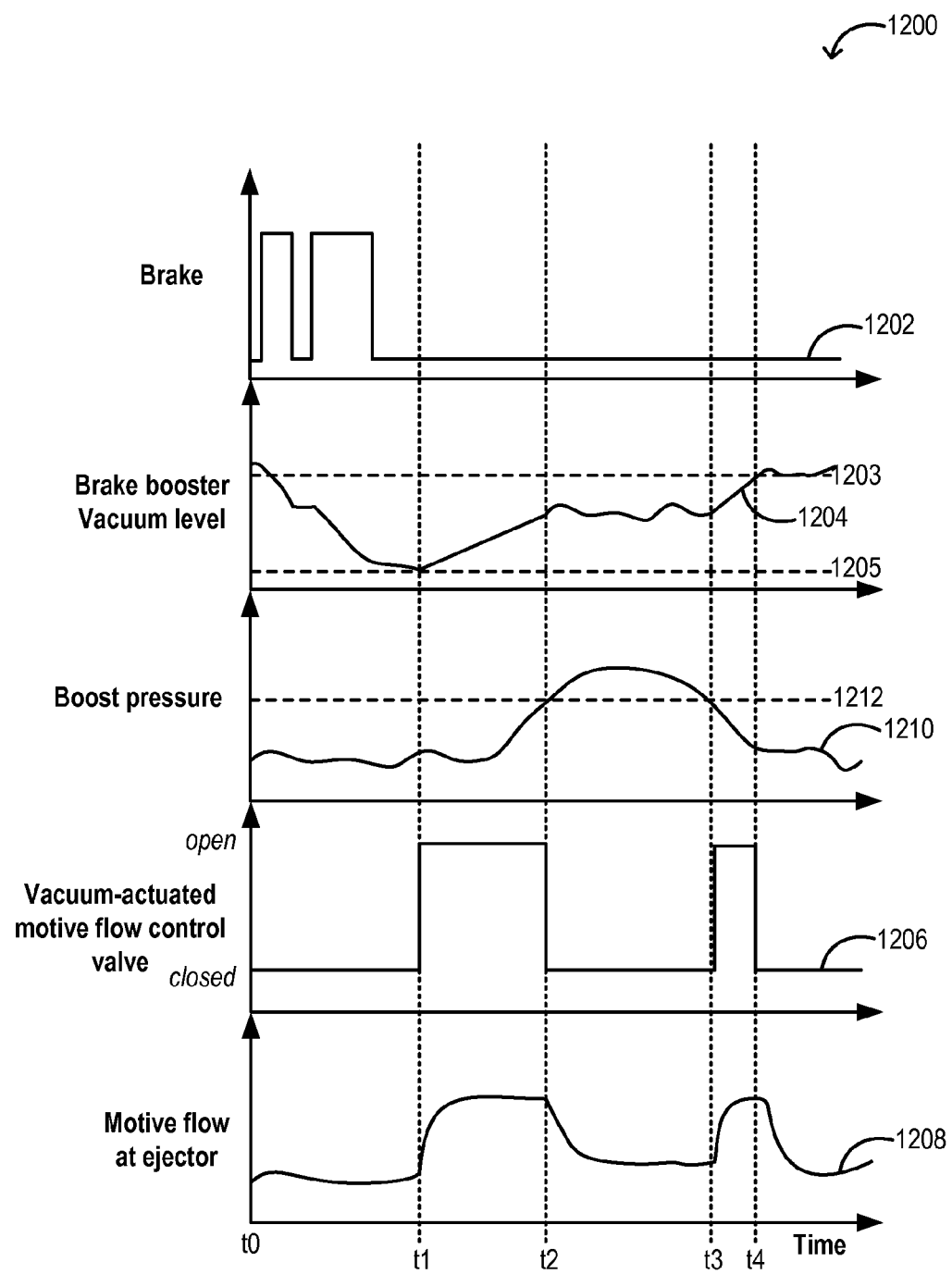
FIG. 12 shows example valve adjustments performed to the vacuum-actuated valve of FIG. 10 to vary motive flow through the ejector.

An example adjustment is now shown with reference to FIG. 12. Map 1200 depicts similar parameters of interest as FIG. 9, including brake pedal application at plot 1202, changes in a brake booster vacuum level at plot 1204, an opening or closing of the vacuum-actuated motive flow control valve at plot 1206, and changes to motive flow at the ejector at plot 1208. Additionally, at plot 1210, changes in boost pressure are depicted.

At t0, a vacuum level at the brake booster vacuum reservoir may be higher than a valve closing threshold 1203. In response to the high vacuum level, the vacuum-actuated motive flow control valve upstream of the ejector may be actuated closed (plot 1206), thereby reducing motive flow through the ejector (plot 1208). Between t0 and t1, the brake pedal may be applied multiple times (plot 1202). As such, since the brake booster is a vacuum-actuated device, with each application of the brake pedal, vacuum may be dissipated from the brake booster vacuum reservoir such that by t1, the vacuum level at the reservoir is below valve opening threshold 1205. As depicted, valve opening threshold 1205 may correspond to a lower level of vacuum than valve closing threshold 1203. Further, boost pressure may be lower than a threshold pressure 1212 prior to time t1, as shown at plot 210

In response to the low vacuum level and boost pressure being below the threshold, at t1, the vacuum actuated valve may be actuated open (plot 1206). Specifically, the low vacuum force may not be sufficient to overcome the compression force of the valve's springs, causing the valve to open. As a result of the valve being opened, motive flow through the ejector may increase and vacuum may be generated at the ejector. For a duration following t1 and prior to t2, vacuum may continue to be drawn and the drawn vacuum may be stored at the vacuum reservoir. That is, between t1 and t2, the reservoir may begin to be replenished with vacuum.

Boost pressure may begin to increase prior to time t2. At t2, boost pressure reaches the pressure threshold 1212 (plot 1210). As a result of the increased boost pressure, the motive flow control valve closes at time t2 (plot 1206) to reduce possible loss of boost through the ejector, even though the vacuum level of the brake booster is still below the valve closing threshold 1203. Due to the vacuum-actuated valve closing, the motive flow through the ejector decreases at time t2 (plot 1208) and the level of vacuum in the brake booster stabilizes, i.e., stops increasing (plot 1204).

At t3, the boost pressure drops back below the threshold pressure 1212 (plot 1210). Because the vacuum level in the brake booster is still below the valve closing threshold 1203, the vacuum-actuated motive flow control valve is opened again, and motive flow through the ejector increases and vacuum continues to build in the brake booster. At t4, the vacuum level at the reservoir may rise above valve closing level 1203. In response to the high vacuum level, the vacuum actuated valve may be actuated close (plot 1206). Specifically, the high vacuum force may overcome the compression force of the valve's springs, causing the valve to close. As a result of the valve being closed, motive flow through the ejector may decrease and vacuum generation at the ejector may be reduced (or stopped). In this way, an opening of a vacuum-actuated valve coupled upstream of an ejector may be adjusted to vary a motive flow through the ejector, where the ejector is coupled across an intake throttle, the valve coupled to a vacuum reservoir.

In some embodiments, the vacuum-actuated valve of FIG. 10 may be opened or closed so as to operate the engine system in different modes based on the engine vacuum requirements. As one example, an engine system may comprise an engine including an intake manifold, the intake manifold coupled to a vacuum reservoir along a first passage; a compressor positioned in an intake passage upstream of the intake manifold; an intake throttle upstream of the intake manifold and downstream of the compressor; an ejector positioned in a bypass passage across the compressor and intake throttle, a neck of the ejector coupled to the vacuum reservoir along a second passage, an outlet of the ejector coupled to the vacuum reservoir and the intake manifold along the first passage; a motive flow control valve coupled in the bypass passage upstream of an inlet of the ejector; a vacuum actuator coupled to the motive flow control valve, the vacuum actuator coupled to the vacuum reservoir to an outlet of the compressor; and a controller with computer-readable instructions for: operating the engine system in a first mode with the motive flow control valve open to increase motive flow through the ejector; and operating the engine system in a second mode with the motive flow control valve closed to decrease the motive flow. The vacuum reservoir may be coupled to a brake booster.

In one example, the engine system is operated in the first mode when a vacuum level in the vacuum reservoir is below a threshold level and boost pressure is less than a threshold pressure, and the engine system is operated in the second mode when boost pressure is greater than the threshold pressure.

In another example, the engine system is operated in the first mode when a vacuum level in the vacuum reservoir is below a threshold level and boost pressure is less than a threshold pressure, and the engine system is operated in the second mode when the vacuum level is above the threshold. Operating in the first mode may be continued until the vacuum level is higher than the threshold. The controller may include further instructions for transitioning engine system operation from the first mode to the second mode after the vacuum level is higher than the threshold.

In an example, a method for controlling motive flow through an ejector includes adjusting a valve coupled upstream of an intake ejector based on boost pressure, the valve adjusted to control motive flow into the ejector from upstream of a compressor. The valve may close in response to boost pressure being higher than a threshold. The valve may further be adjusted based on a vacuum level in a vacuum reservoir.

The method may include drawing vacuum at the ejector and storing the drawn vacuum at the vacuum reservoir. Adjusting the valve based on the vacuum level may comprise opening the valve responsive to the vacuum level at the vacuum reservoir being lower than a threshold, and drawing vacuum may include drawing vacuum at the ejector until the vacuum level at the vacuum reservoir is above the threshold. After the vacuum level at the vacuum reservoir is above the threshold, the valve may be closed. Additionally, while opening the valve, an intake throttle opening may be adjusted to maintain intake air flow rate. The valve may a vacuum-actuated valve (and not a solenoid valve).

In another example, a method for an engine comprises when a vacuum level of a vacuum reservoir is lower than a threshold level and boost pressure is less than or equal to a threshold pressure, opening a valve coupled upstream of an ejector to draw motive flow into the ejector from upstream of a compressor, the motive flow discharged from the ejector into an intake manifold, downstream of an intake throttle; and in response to one of the vacuum level of the vacuum reservoir being higher than the threshold level and boost pressure being higher than the threshold pressure, closing the valve. The threshold pressure may be barometric pressure.

A neck of the ejector may be coupled to the vacuum reservoir along a first passage, an outlet of the ejector may be coupled to the vacuum reservoir along a second passage, and the vacuum-actuated valve may be coupled to the vacuum reservoir along a third passage. The first, second, and third passages may merge downstream of an outlet of the vacuum reservoir, each of the first and second passages including a check valve.

The second passage may further couple the vacuum reservoir to an engine intake manifold downstream of a juncture with the ejector outlet. The vacuum-actuated valve may be coupled directly to the vacuum reservoir along the third passage. The vacuum-actuated valve may be further coupled to an engine intake passage, downstream of the compressor. The vacuum reservoir may be coupled to one or more engine vacuum consumption devices, such as one or more of a brake booster, a purge canister, and a charge motion control valve.

In this way, a motive flow control valve may be pneumatically controlled to vary motive flow through an ejector. By actuating the valve using a vacuum source, the opening and closing of the valve may be adjusted based on vacuum requirements. In particular, during low vacuum conditions, when a vacuum source needs to be replenished, the vacuum-actuated valve may be opened to increase motive flow at the ejector, and draw more vacuum from the ejector. Then, during high vacuum conditions, when the vacuum source does not need to be replenished, the vacuum-actuated valve may be closed to decrease motive flow at the ejector, and draw less vacuum from the ejector. The approach enables vacuum needs to be met by varying motive flow without degrading an intake throttle's ability to establish a low airflow rate during idling conditions. Overall, vacuum generation efficiency is increased at low component cost and complexity.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method, comprising:
   determining boost pressure in at least one of an intake passage and an intake manifold; determining a vacuum level in a vacuum reservoir adjusting a valve coupled upstream of an intake ejector based on the boost pressure, the valve adjusted to control motive flow into the ejector from upstream of a compressor; wherein adjusting the valve comprises adjusting the valve based on the vacuum level in the vacuum reservoir and closing the valve in response to the boost pressure being higher than a threshold, the threshold comprising compressor inlet pressure; and
   adjusting a compressor bypass valve coupled across the compressor to control the boost pressure.

2. The method of claim 1, further comprising, drawing vacuum at the ejector and storing the drawn vacuum at the vacuum reservoir.

3. The method of claim 2, wherein adjusting the valve based on the vacuum level comprises opening the valve responsive to the vacuum level at the vacuum reservoir being lower than a threshold, and wherein drawing vacuum includes drawing vacuum at the ejector until the vacuum level at the vacuum reservoir is above the threshold.

4. The method of claim 3, further comprising, after the vacuum level at the vacuum reservoir is above the threshold, closing the valve.

5. The method of claim 3, further comprising, while opening the valve, adjusting an opening of an intake throttle to maintain intake air flow rate.

6. The method of claim 1, wherein the valve is a vacuum-actuated valve coupled to a vacuum reservoir and to an intake passage downstream of the compressor.

7. A method for an engine, comprising:
   determining boost pressure in at least one of an intake passage and an intake manifold; determining a vacuum level in a vacuum reservoir; when the vacuum level of the vacuum reservoir is lower than a threshold level and the boost pressure is less than or equal to a threshold pressure, opening a valve coupled upstream of an ejector to draw motive flow into the ejector from upstream of a compressor, the motive flow discharged from the ejector into an intake manifold, downstream of an intake throttle; and
   in response to one of the vacuum level of the vacuum reservoir being higher than the threshold level and the boost pressure being higher than the threshold pressure, closing the valve.

8. The method of claim 7, wherein the threshold pressure is barometric pressure.

9. The method of claim 7, wherein a neck of the ejector is coupled to the vacuum reservoir along a first passage, an outlet of the ejector is coupled to the vacuum reservoir along a second passage, and wherein the valve is a vacuum-actuated valve coupled to the vacuum reservoir along a third passage, the first, second, and third passages merging downstream of an outlet of the vacuum reservoir, each of the first and second passages including a check valve.

10. The method of claim 9, wherein the second passage further couples the vacuum reservoir to an engine intake manifold downstream of a juncture with the ejector outlet and wherein the vacuum-actuated valve is coupled directly to the vacuum reservoir along the third passage.

11. The method of claim 9, wherein the vacuum-actuated valve is further coupled to an engine intake passage, downstream of the compressor.

12. The method of claim 7, wherein the vacuum reservoir is coupled to one or more engine vacuum consumption devices.

13. The method of claim 7, wherein the vacuum reservoir is coupled to one or more of a brake booster, a purge canister, and a charge motion control valve.

14. A system, comprising:
   an engine including an intake manifold, the intake manifold coupled to a vacuum reservoir along a first passage; a pressure sensor coupled to the vacuum reservoir to provide an estimate of the vacuum level at the vacuum reservoir; a manifold air pressure sensor that detects a boost pressure in the intake manifold
   a compressor positioned in an intake passage upstream of the intake manifold;
   an intake throttle upstream of the intake manifold and downstream of the compressor;
   an ejector positioned in a bypass passage across the compressor and intake throttle, a neck of the ejector coupled to the vacuum reservoir along a second passage, an outlet of the ejector coupled to the vacuum reservoir and the intake manifold along the first passage;
a motive flow control valve coupled in the bypass passage upstream of an inlet of the ejector;
a vacuum actuator coupled to the motive flow control valve, the vacuum actuator coupled to the vacuum reservoir and to an outlet of the compressor; and
a controller with non-transitory computer-readable instructions for:
  operating the engine system in a first mode with the motive flow control valve open to increase motive flow through the ejector; and
  operating the engine system in a second mode with the motive flow control valve closed to decrease the motive flow; and wherein the engine system is operated in the first mode when the vacuum level in the vacuum reservoir is below a threshold level and the boost pressure is less than a threshold pressure, and wherein the engine system is operated in the second mode when the boost pressure is greater than the threshold pressure.

15. The system of claim 14, wherein the engine system is operated in the first mode when the vacuum level in the vacuum reservoir is below a threshold level and the boost pressure is less than a threshold pressure, and wherein the engine system is operated in the second mode when the vacuum level is above the threshold.

16. The system of claim 15, wherein operating in the first mode is continued until the vacuum level is higher than the threshold, and wherein the controller includes further instructions for transitioning engine system operation from the first mode to the second mode after the vacuum level is higher than the threshold.

17. The system of claim 14, wherein the vacuum reservoir is coupled to a brake booster.

* * * * *